US012802328B2

(12) United States Patent
Bitonti et al.

(10) Patent No.: US 12,802,328 B2
(45) Date of Patent: Nov. 17, 2026

(54) SYSTEMS AND METHODS FOR GENERATING SYNTHETIC DATA FROM A DATABASE OF NODES AND RELATIONSHIPS

(71) Applicant: LexSet.ai Inc., Brooklyn, NY (US)

(72) Inventors: Francis Bitonti, Brooklyn, NY (US); Li Chen, Basel (CH); Charles Erway, Nixa, MO (US); Christian Gartland, Brooklyn, NY (US); Azam Khan, Gig Harbor, WA (US)

(73) Assignee: LexSet.ai Inc., Brooklyn, NY (US)

( * ) Notice: Subject to any disclaimer, the term of this patent is extended or adjusted under 35 U.S.C. 154(b) by 21 days.

(21) Appl. No.: 18/703,327

(22) PCT Filed: Oct. 21, 2022

(86) PCT No.: PCT/US2022/047371

§ 371 (c)(1),
(2) Date: Apr. 19, 2024

(87) PCT Pub. No.: WO2023/069676

PCT Pub. Date: Apr. 27, 2023

(65) Prior Publication Data

US 2024/0428497 A1 Dec. 26, 2024

Related U.S. Application Data

(60) Provisional application No. 63/270,405, filed on Oct. 21, 2021.

(51) Int. Cl.

| | |
|---|---|
| ***G06K 9/34*** | (2006.01) |
| ***G06F 16/28*** | (2019.01) |
| ***G06T 15/00*** | (2011.01) |

(52) U.S. Cl.
CPC ............ *G06T 15/00* (2013.01); *G06F 16/285* (2019.01)

(58) Field of Classification Search
None
See application file for complete search history.

(56) References Cited

U.S. PATENT DOCUMENTS

| | | | | |
|---|---|---|---|---|
| 2009/0187542 A1* | 7/2009 | Begley | .................. | G06F 16/907 |
| 2020/0201514 A1* | 6/2020 | Murphy | .................. | G06F 3/011 |
| 2020/0401835 A1* | 12/2020 | Zhao | .................... | G06V 10/255 |
| 2021/0134028 A1* | 5/2021 | Cai | ........................ | G01R 33/50 |

* cited by examiner

*Primary Examiner* — Carl Adams
(74) *Attorney, Agent, or Firm* — Norton Rose Fulbright US LLP

(57) ABSTRACT

Embodiments of the present disclosure include methods and systems for generating a parametric representation and a synthetic dataset. In some embodiments, a database of nodes may be constructed. The database of nodes may include a plurality of nodes, wherein each node may represent an object associated with one or more parametric properties. Embodiments include evaluating a set of relationships for at least one subset of nodes. A method may include assigning a semantic category to at least one node and extracting the parametric representation. In some embodiments, a first node of the plurality of nodes is selected based at least in part on the semantic category, and a second node is selected based at least in part on a relationship of the second node with the first node. Embodiments may include generating a synthetic dataset based on the parametric representation or a semantic category that links nodes.

20 Claims, 11 Drawing Sheets

700 neo4j$ match (parent:Bedroom)-[relation]→(child:Bedroom) return parent, relation, child 740 720 740

| **"parent"** 710 | **"relation"** 720 | **"child"** 730 |
|---|---|---|
| {"category":"nightstand"} | {"rules":"[["put", {"uv": [0.5, 0.5], "rotation": [0, 360]}]]"} 772 | {"category":"book"} 620 |
| {"category":"wall"} 602 | {"rules":"[["mount", {"parent_side": "any", "child_side": "back", "uv": [0.5, 0], "offset": 0.02}]]"} 774 | {"category":"credenza"} 608 |
| {"category":"credenza"} | {"settings":"{"from_folder": "data/ilife/office/television"}","rules":"[["put", {"uv": [0.5, 0.5], "rotation": 0}]]"} | {"category":"television"} 610 |
| {"category":"wall"} 602 | {"rules":"[["rotate", {"degrees": 0}], ["mount", {"parent_side": "right", "child_side": 776 "back", "uv": [[0.6, 1], 0], "offset": 0.1}]]"} 778 | {"category":"armchair"} 612 |
| {"category":"wall"} | {"settings":"{"num": 2, "from_folder": "data/ilife/office/painting", "boundbox_collision": true}","rules":"[["center", {}], ["mount", {"parent_side": "any", "child_side": "back", "uv": [[0.2, 0.8], 0.5]}]]"} 780 | {"category":"painting"} 606 |
| {"category":"wall"} | {"settings":"{"raytrace_mode": "top"}","rules":"[["center", {"on_z": true}], ["mount", {"parent_side": "front", "child_side": "back", "uv": [0.5, 0]}]]"} 782 | {"category":"curtain"} 604 |
| {"category":"wall"} 602 | {"rules":"[["center", {"on_z": true}], ["mount", {"parent_side": "left", "child_side": "back", "uv": [0.5, 0], "offset": 0.1}]]"} 760 | {"category":"bed"} 614 |
| {"category":"bed"} | {"rules":"[["center", {"on_z": true}], ["align", {"side": "back"}], ["neighbour", {"side": "right", "offset": 0.1}]]"} 784 | {"category":"nightstand"} 616 |
| {"category":"bed"} | {"rules":"[["center", {"on_z": true}], ["align", {"side": "back"}], ["neighbour", {"side": "left", "offset": 0.1}]]"} 786 | {"category":"nightstand"} 616 |

*FIG. 7*

SYSTEMS AND METHODS FOR GENERATING SYNTHETIC DATA FROM A DATABASE OF NODES AND RELATIONSHIPS

CROSS-REFERENCE TO RELATED APPLICATIONS

This application claims the benefit of U.S. Provisional Patent Application No. 63/270,405, which was filed Oct. 21, 2021, and is incorporated herein by reference as if fully set forth.

TECHNICAL FIELD

This description relates to data capture, data processing, and data handling techniques. More specifically, this description relates to semantic networks and connectionist systems.

BRIEF SUMMARY

Embodiments of the present disclosure include methods for generating a parametric representation. In some embodiments, the method may include querying a database of nodes. The database of nodes may include a plurality of nodes. In some embodiments, each node of the plurality of nodes may represent an object associated with one or more parametric properties. Embodiments of the present disclosure include evaluating a set of relationships for at least one subset of nodes of the database of nodes. The method may include assigning a semantic category to at least one node of the plurality of nodes. Embodiments of the present disclosure include extracting the parametric representation corresponding to the plurality of nodes and the set of relationships. In some embodiments, a first node of the plurality of nodes may be selected based at least in part on the semantic category, and a second node may be selected based at least in part on a relationship of the second node with the first node. Embodiments of the present disclosure may include generating a synthetic dataset based on the parametric representation. In some embodiments, the synthetic dataset may include at least one element of the semantic category.

Embodiments of the present disclosure include methods for generating a parametric representation. In some embodiments, the method includes connecting to at least one database of nodes, including a plurality of nodes. The plurality of nodes may be represented based on at least one semantic category. In some embodiments, each of the nodes may represent an object that may be associated with one or more parametric properties. In some embodiments, the method may include selecting at least one semantic category based on at least one relationship associated with the plurality of nodes. In some embodiments, the method may include running a query of the selected at least one relationship. The query may pertain to a relationship associating a first node with at least a second node of the plurality of nodes. In some embodiments, the method may include extracting at least one parametric representation, wherein at least one parametric representation may include a first object associated with the first node and a second object associated with the second node.

Embodiments of the present disclosure include methods for generating a parametric representation. In some embodiments, the method may include connecting to at least one database of nodes. The database of nodes may be organized by at least one semantic category. In some embodiments, each of the nodes from the at least one database of nodes represents an object that is associated with one or more parametric properties. Embodiments may include selecting the at least one semantic category. In some embodiments, the method may include running a query of the selected at least one semantic category, the query containing a first node from the at least one semantic category and at least one relationship associated with the first node. The relationship may connect the first node to at least one second node. Embodiments may include extracting at least one parametric representation, which includes the selected one or more relationship. In an embodiment, first object may be associated with one or more parametric properties of the first node and a second object may be associated with one or more parametric properties of the second node.

Embodiments of the present disclosure include a system for generating a parametric representation. In some embodiments, the system may include a processor coupled with memory. The processor may include a parametric representation generator and a synthetic data generator. In some embodiments, the parametric representation generator may be used to query a node database comprising a plurality of nodes having common parametric parameters or semantic category membership. The processor may also apply a classification algorithm to apply a semantic category classification to a set of nodes. Such a classification process may be helpful for generating a randomized synthetic dataset by grouping nodes with common attributes as candidates for inclusion within the rendered synthetic dataset. For example, a living quarters may include a number of objects. The objects may include a bar stool, a sofa, a love seat, an ottoman, a bench seat, a chair, a rocking chair, or a recliner. This collection of objects could be classified using an artificial intelligence classifier to recognize each of the objects as belonging to the semantic category of "seating." In querying a database for "seating," each of the aforementioned objects would be identified for possible inclusion in a synthetic dataset. Such a query reduces the need to specify each object for inclusion, simplifying the construction of the query for an end user. By using additional parametric properties, for example only querying "seating" with four legs, a user may be able to render a sufficiently random synthetic dataset or determine how a dataset with four legged "seating" performs in a computer vision application versus three-legged "seating."

Further, each node of the plurality of nodes may represent an object associated with one or more parametric properties. The parametric representation generator may evaluate a set of relationships for at least one subset of nodes of the database of nodes. In some embodiments, the parametric representation generator assigns a semantic category to at least one node of the plurality of nodes. In some embodiments, the parametric representation generator may extract the parametric representation corresponding to a plurality of nodes and the set of relationships. In some embodiments, a first node of the plurality of nodes may be selected based at least in part on the semantic category. In some embodiments, a second node may be selected based at least in part on a relationship of the second node with the first node. Embodiments may include the synthetic data generator that may generate a synthetic dataset based on the parametric representation. In some embodiments, the synthetic dataset may include at least one element of the semantic category.

Embodiments of the present disclosure include a non-transitory computer readable medium. The readable medium may include machine executable instructions that may be executable by a processor to query a database of nodes including a plurality of nodes. Each node of the plurality of nodes may represent an object associated with one or more parametric properties. The processor may evaluate a set of relationships for at least one subset of nodes of the database of nodes. The processor may assign a semantic category to at least one node of the plurality of nodes. The processor may extract the parametric representation corresponding to the plurality of nodes and the set of relationships. In some embodiments, a first node of the plurality of nodes may be selected based at least in part on the semantic category. In some embodiments, a second node may be selected based at least in part on a relationship of the second node with the first node.

BRIEF DESCRIPTION OF THE FIGURES

FIG. 7 depicts an example representation of a semantic category associated with the database of nodes of FIG. 6A.

DETAILED DESCRIPTION

Figure 1A:
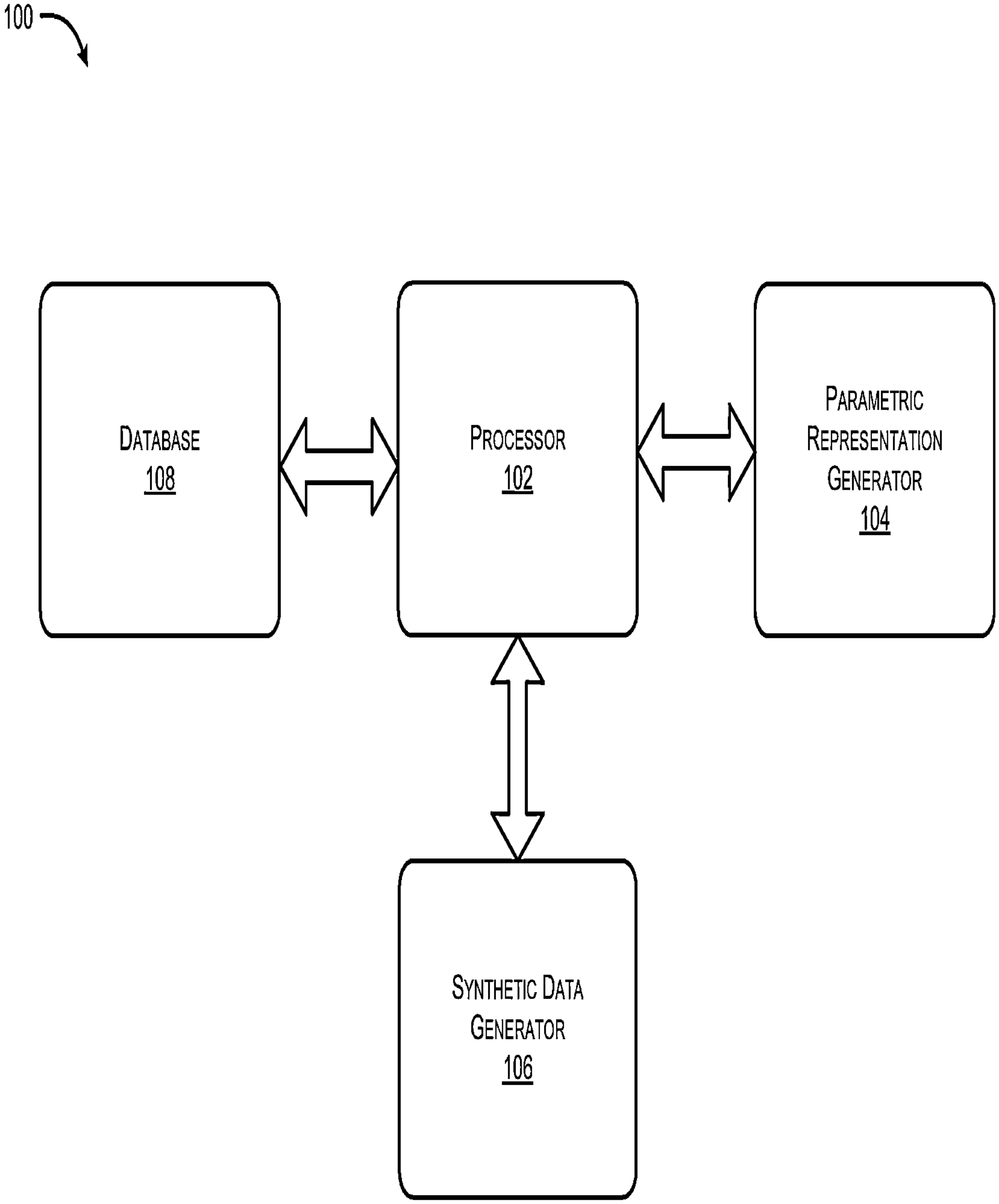
FIG. 1A depicts an example system architecture for generation of parametric representation and synthetic data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Various embodiments provide a solution in the form of systems and methods for generating a parametric representation. Exemplary embodiments of the present disclosure have been described in the framework of facilitating the generation of parametric representations in space and/or spacetime. The parametric representation may be generated based on data within a database of nodes. A database of nodes may include a plurality of nodes where each node pertains to an object. One suitable database for containing information about objects and the relationships between objects for purposes of generating synthetic data is a graph database. Graph databases, such as those programmed in languages like Neo4j are advantageous when the relationships amongst objects are frequently searched. In such circumstances, graph databases can perform better than heavily indexed databases, like those used in Relational Database Management Systems or RDBMS. Exemplary embodiments may also evaluate or establish a set of relationships between at least a subset of nodes of the database of nodes. Exemplary embodiments may further be related to assignment of a semantic category to at least one node. The semantic category may provide a high order taxonomy of objects. For example, a semantic category of "seating" might include chairs, barstools, sofas, love seats, a stool, and the like. Use of a semantic category holds several benefits, for example to enable selection of a first node from the plurality of nodes for generating a synthetic dataset. For example, an exterior synthetic image may request a user to select a semantic category, like a "vehicle" for populating a scene. When generating the synthetic image, the objects within the semantic category "vehicle" may be randomly selected and relationships with other objects used to populate an outdoor scene further. In this instance, a second node may be selected based on the set of relationships of objects within the semantic category. For example, an object like a boat may be selected for placement in the image due to the boats membership within the semantic category "vehicle." Relationships between the boat and other objects, for example a proximity to a second object, e.g., a "boat dock" to populate the synthetic image.

Exemplary embodiments may also enable extraction of a parametric representation corresponding to a plurality of nodes and the set of relationships. Based on the parametric representation, synthetic data may be generated and processed further. The system and the method can thus generate a parametric representation and synthetic data (interchangeably referred to as synthetic dataset) starting from database of nodes. The generation of parametric representation may be crucial in establishing relationship between objects for enabling 3D representation of the objects for various purposes that may be related to, without limitation, applications such as object recognition, object classification, machine vision, and computer vision. Further, the generation of synthetic data may also enable highly accurate labeling of various objects within the synthetic dataset. Such labeling is advantageous for training artificial intelligence models used in applications like computer vision. However, one of ordinary skill in the art will appreciate that the present disclosure may not be limited to such applications/scenarios and while synthetic data is commonly used to describe fully rendered images, such as photorealistic images, it is an objective of the present invention to provide synthetic data necessary for training algorithms. In such embodiments, the inventors contemplate synthetic datasets where no rendering of an image is required.

FIG. 1A shows an exemplary system architecture according to some embodiments of the present disclosure. FIG. 1A depicts an example system 100 for the generation of a parametric representation and synthetic data. The system 100 may be implemented by way of a single device or a combination of multiple devices that are operatively connected or otherwise networked together, such as in the instance where distributed processing across multiple servers is used. The system 100 may be implemented in hardware or a suitable combination of hardware and software. The system 100 includes a processor 102 or processors, memory, and may include connectivity. The processor 102 may include a parametric representation generator 104 and a synthetic data generator 106. Exemplary embodiments may include a parametric representation generator 104 to obtain a parametric representation. In an example embodiment, the parametric representation may pertain to a space or spacetime including a three-dimensional (3D) representation. The 3D representation may pertain to an object, or multiple objects, in a 3D environment. A four-dimensional representation, such as a 3D CAD file that changes in a characteristic in time, may also be possible in some embodiments. To generate the parametric representation, the parametric representation generator 104 may query a database of nodes, or otherwise call a database of nodes, for example a graph database. Each node of the plurality of nodes may represent an object or different objects with defined relationships, or edges within the graph database. Each object may be associated with one or more parametric properties. The parametric properties may pertain to various physical and characteristic based attributes that may define or describe the object in a better manner. In some embodiments, the object or node may be associated with a CAD file or 3D rendering of the object annotated with metadata and/or a model. In some embodiments the model may be one of a physics-based approach or statistical approach. Such models are useful in a four-dimensional representation to reflect the object's state when placed in an environment (e.g., a metal in a salt environment), an operating state, or to reflect the wear of the object in time. Such models and additional integrations with sensor data from real-world assets, such as the case with digital twins, may be used to enrich a generated synthetic dataset.

The parametric representation generator 104 may evaluate a set of relationships for at least one subset of nodes of the database of nodes. In an example embodiment, a graph database may be implemented such that each node in the plurality of nodes of the graph database may pertain to an object, whereas an edge between two nodes may represent a relationship between the two nodes, e.g., a relationship between the objects corresponding to the two nodes. The parametric representation generator 104 may assign a semantic category to at least one node of the plurality of nodes, or the semantic category may be used to select a node when classification has already occurred. The semantic category may pertain to category-based information of the object wherein the object is a member within a group denoted by the semantic category. The parametric representation generator 104 may extract the parametric representation corresponding to the plurality of nodes and the set of relationships. The parametric representation may be extracted by selecting a first node of the plurality of nodes based at least in part on the semantic category. Based on a relationship of a second node with the first node, the second node may be selected. However, one of ordinary skill in the art will appreciate that the mentioned aspect of extracting parametric representation may be applicable to some nodes or all nodes of the plurality of nodes and mention of first/second node has been only done for ease of understanding. The synthetic data generator 106 of the system 100 may generate a synthetic dataset based on the parametric representation. In an example embodiment, the synthetic dataset may include at least one element of the semantic category. The system 100 may also include database 108, which may enable to store generated parametric representation and/or synthetic dataset as well as other aspects including, but not limited to, set of relationships, information pertaining to the plurality of nodes, information pertaining to database of nodes/plurality of nodes and configuration file pertaining to a query or parametric representation.

The system 100 may be a hardware device, such as a server, including the processor 102 executing machine readable program instructions to facilitate generation of a parametric representation and synthetic data. Execution of the machine-readable program instructions by the processor 102 may enable the proposed system to facilitate a rule-based anonymization of an original dataset. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, libraries, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, feature extraction, and/or any other functions. Any reference to a task in the present disclosure may refer to an operation being or that may be performed on data.

Figure 1B:
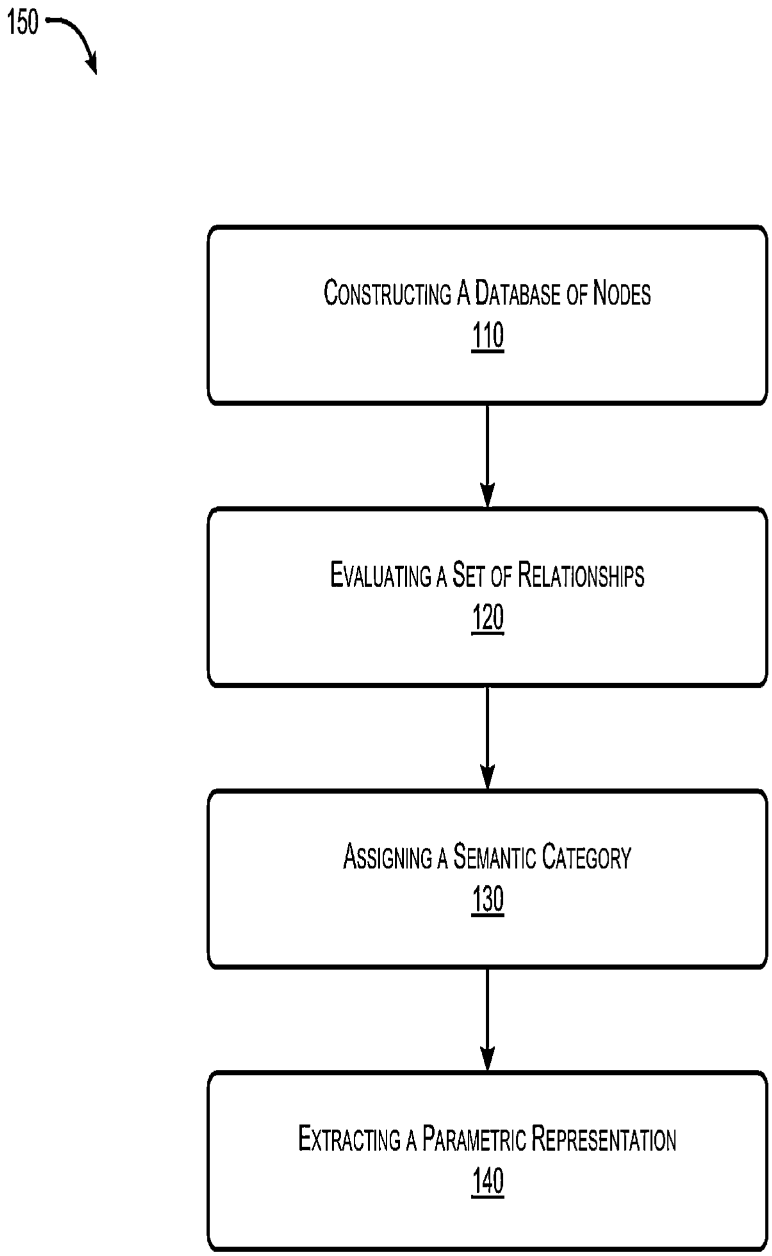
FIG. 1B depicts exemplary operations in high-level logic flow of an operational process for extracting a parametric representation.

FIG. 1B shows an exemplary method depicting exemplary operations in high-level logic flow of an operational process for extracting a parametric representation, according to some embodiments of the present disclosure. According to FIG. 1B, embodiments may include a method for generating a parametric representation of space or spacetime, wherein the method may include steps 110 to 140. At 110, the method may include querying a database of nodes comprising a plurality of nodes. In some embodiments, each node of the plurality of nodes may represent at least one object. In some embodiments, each object may be associated with one or more parametric properties. At 120, the method may include a step of evaluating a set of relationships for at least one subset of nodes of the database of nodes. At 130, the method may include assigning a semantic category to at least one node of the plurality of nodes. At 140, the method may include extracting the parametric representation corresponding to the plurality of nodes and the set of relationships. In some embodiments, a first node of the plurality of nodes is selected based at least in part on the semantic category. In some embodiments, a second node may be selected based at least in part on a relationship of the second node with the first node.

In an example embodiment, the database of nodes may include or pertain to a graph database. The term "graph database" may refer to a database implementation that stores data as nodes and edges (representing relationships) such that the implementation allows storage of data that shows how each individual entity or object involved is connected or related each other. The plurality of nodes in the database of nodes may be related to the at least one object. For example, the at least one object may pertain to movable items that may be able to be shifted from one place to the other in three-dimensional space, such as, for example, a table, bed, book, sofa, television, lamp, cushion, curtain, and other such items. In another example, the object may pertain to immovable items that may not be possible to move or relocate in three-dimensional space, such as, for example, a wall, door, floor, and other such items. Each object may be related to other objects in one or more ways such as position, proximity, orientation, size, compatibility, and other factors. For example, the object "table" supported by a "lamp" may be related in terms of closeness of relative position between the table and lamp. In some embodiments, the set of relationships may be related to placement of one object with respect to another object. For example, a lamp being placed on top of a specific surface of the table. These set of relationships are evaluated in step 120 so as to derive specific relationships between various objects pertaining to the plurality of nodes in the database of nodes. Various other examples of objects and/or relationships are possible.

In reference to the object as mentioned hereinabove, each object may include one or more parametric properties. The parametric properties may include a property of the object pertaining to at least one of a physical dimension, a light reflective property, a light absorptive property, a texture property, a movement property, a deformation property, a color property, and a metadata property. In some embodiments, the parametric properties may vary with each object, such as, for example, the physical dimension of objects may vary. Another example may include variation in the property of objects may include an example that few objects can be shifted in a given area (example: book, lamp, etc.) across a given area and few objects may not be movable (for example, wall, door, or others). In some other embodiments, the parametric property of one object may vary with time. In some other embodiments, the parametric property of one object may be constant with respect to time. The parametric property pertaining to physical dimension of the object may include at least one of length, width, height, depth, perimeter, area, and volume of the object. Other physical dimension-based aspects may also be included. In some embodiments, the parametric property pertaining to light reflective property may include at least one of specularity, translucence, opacity, diffusion, diffraction, refraction, and reflection. The term "specularity" may refer to the visual appearance of specular reflections of an object, e.g., reflection of light source on the object, the term "translucence" may refer to partial transparency of the object and the term "opacity" may refer to a property of impenetrability of light passing through an object. The parametric property pertaining to the light absorptive property may include at least one of a matte property, a black property, and a shadow property. In an embodiment, the matte property may refer to the texture or nature of surface of an object as visible upon interaction with light. The black property may refer to the darker regions visible in an object based on light absorption and reflection, whereas the shadow property may refer to formation of shadow around the object due to a light source around it.

In some embodiments, the parametric property pertaining to movement property may include at least one of velocity, acceleration, spin, and vibration. As an example, the movement property corresponding to the velocity of the object may pertain to change in a relative position of the object over a period or interval of time. Other relevant properties related to movement that may or may not change over time may also be included. In some embodiments, the parametric property pertaining to a color property may include at least one of hue, tone, bit depth, warmth, brightness, white balance, and contrast. In some embodiments the color may be associated with a model that describes how a color may fade over time. In some embodiments, the parametric property pertaining to metadata property may include at least one of a semantic tag, a binary code, a priority tag, a weighting tag, and a relationship tag. The metadata property may enable to label the object as well as store at least a minimum required information about the object for improved utility of the information about objects as stored in the database of nodes. For example, the objects pertaining to each node in the database of nodes may be assigned a relationship tag as metadata that may define the relationship of the object with other objects. In other embodiments, the objects pertaining to each node may be assigned the priority tag as metadata that may define the priority of the object in a 3D space of the parametric representation. In other embodiments, the objects pertaining to each node may be assigned the semantic tag as metadata that may enable to relate the property of the object to pre-defined information or other objects based on semantic similarity. Various other types of metadata may be possible to be used.

In some embodiments, it may be possible that the parametric properties of the object pertaining to the nodes (in the database of nodes) may be obtained through one or more sensors coupled with the object as a sensor data. In some embodiments, the sensor data may be able to provide information pertaining to at least one of a visual information, 3D perspective of objects, aesthetics, location, sound characteristics, and other such attributes. In some embodiments, the sensor data may also be related to at least one of camera data, audio sensor data, touch sensor data, and position sensor data. Various other sensor data can also be captured. In some embodiments, the processor 102 of the system 100 may use the sensor data for querying a plurality of nodes in the database of nodes having parameters that fit the desired sensor response (e.g., a reflectivity, opacity, degradation over time). In some embodiments, the sensor data can be used to identify a relationship between the object identified by the query and a second object related to the queried object. In another embodiment, the sensor data may be stored in a separate database (such as, for example, s 3D asset database) for loading 3D assets for generating and/or rendering synthetic data.

In some embodiments, the set of relationships may include named edges within a graph schema, wherein each edge represents a relationship between two nodes of the plurality of nodes. In some other embodiments, the set of relationships may be depicted as a plurality of link-fact type representation in an Object-Role Model. In reference to the step 120 in FIG. 1B, the set of relationships may be evaluated for at least one subset of nodes to assess at least one of a relative position relationship, a relative size relationship, a relative movement relationship, a relative attraction relationship, and a relative repulsion relationship. The set of relationships may be mainly evaluated to understand the relationship between various objects pertaining to the plurality of nodes. In one example, the relative position relationship may mainly define how two objects are related to each other with respect to position, such as, for example, a lamp (first object) may be supported on a table (second object). In some embodiments, the relative movement relationship may elaborate on how one object may change position with respect to another object pertaining to the nodes. In some embodiments, the relative size relationship may elaborate on how one object may be related to other object in terms of size, such as, for example, one object may be half the size of another object. In some embodiments, the relative attraction relationship and/or relative repulsion relationship may elaborate on how one object may or may not be compatible in proximity of another object such as, for example, an object made of low temperature-based polymers may not be compatible around an object coupled with heat source and hence may not be placed around each other. Various other examples may be possible.

In reference to the step 130 in FIG. 1B, the assigning of the semantic category to at least one node may include assigning a category-based information pertaining to the object selected from at least one of an object category, an object type, an object name, an object metadata tag, and an object taxon. The semantic category may mainly collate or combine one or more objects pertaining to the plurality of nodes within a category based on semantic similarity. For example, the object name category may be considered if two or more objects have a common name, such as, for example, two different tables as objects can be assigned object name category as "table". For example, the object type category may be considered if two or more objects have a common type, such as, for example, a table and a chair as objects can be assigned object type category as "furniture". It may be appreciated that the mentioned examples are only for the sake of understanding and several other embodiments are possible for semantic category.

In reference to the step 140 in FIG. 1B, the parametric representation may include a physical representation of a relative position of a first object and a second object in the 3D space. In some embodiments, the first object may be a member of a specific subset of the semantic category. In some embodiments of the present disclosure, steps 110-140 are described in FIG. 1B, it is possible to obtain a parametric representation pertaining to a space or spacetime. In some embodiments, the parametric representation may include a three-dimensional (3D) representation of at least one object corresponding to the plurality of nodes in a 3D environment. Such a parametric representation may provide a 3D perspective of objects that may be queried within a database of nodes such that at least one node represents a dimension of a three-dimensional (3D) space. In an exemplary embodiment, the first object may pertain to a table, and the second object may pertain to a lamp. The physical representation of the relative position of the first object and the second object in the 3D space includes a visual representation of the table supporting a lamp. In this example, the table may be a member of the specific semantic category of furniture. In some embodiments, the parametric representation may include a configuration file that includes a query of a semantic category. In some embodiments, the configuration file may include the resulting nodes and relationships to be used in generating a synthetic dataset. In some embodiments, the configuration file may also include probabilities associated with the nodes, for example the probability a node may appear in the synthetic dataset. Similarly, the configuration file may include an environment in which the nodes may appear, for example an outdoor environment, a satellite image of earth or other aerial zoomed-in view of a city or natural feature, an industrial space, a shipping container, a living quarters, or industrial setting like an oil rig.

Figure 2:
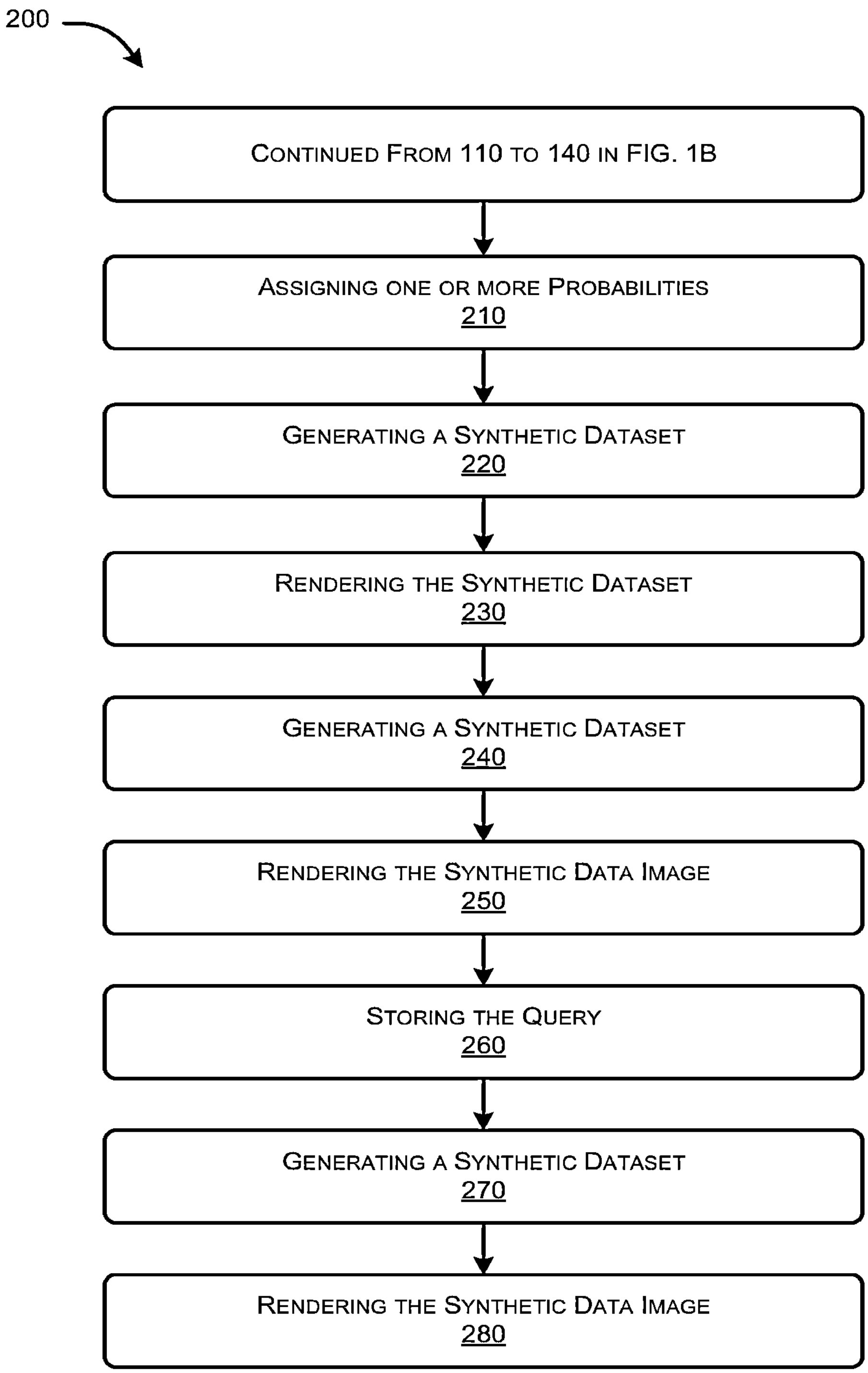
FIG. 2 depicts additional exemplary operations for generation of synthetic data in a high-level logic flow of the operational process of FIG. 1B.

FIG. 2 shows another exemplary method according to some embodiments of the present disclosure. Specifically, FIG. 2 depicts additional exemplary operations for the generation of synthetic data in a high-level logic flow of the operational process of FIG. 1B. At 210, the method may include assigning one or more probabilities to at least one subset of the set of relationships. One or more probabilities may be assigned to evaluate the set of relationships for at least one subset of nodes (as described in step 120 of FIG. 1B). At 220, the method may include generating a synthetic dataset based on the parametric representation. In some embodiments, the synthetic dataset includes at least one element of at least one semantic category. At 230, the method may include rendering the synthetic dataset within a contextual environment. At 240, the method may include generating a synthetic dataset based on at least one parametric representation extracted. At 250, the method may include rendering a synthetic data image based on at least one parametric representation extracted. At 260, the method may include storing the query of the selected at least one semantic category in a configuration file. At 270, the method may include generating a synthetic dataset based on at least one parametric representation extracted. At 280, the method may include rendering a synthetic data image based on at least one parametric representation extracted.

Figure 3:
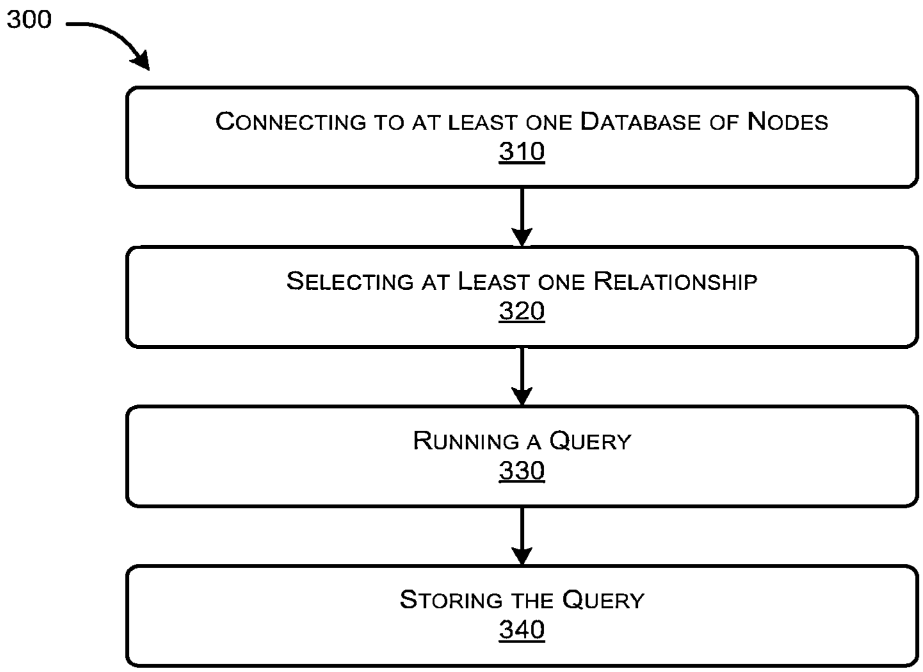
FIG. 3 depicts exemplary operations in a high-level logic flow of the operational process of FIG. 1B.

FIG. 3 shows an exemplary method 300 according to some embodiments of the present disclosure. Specifically, FIG. 3 depicts exemplary operations in a high-level logic flow of the operational process of FIG. 1B, wherein as illustrated in FIG. 3, embodiments may include a method for generating a parametric representation of space or spacetime, the method including steps 310 to 340. The method steps 310-340 indicate the outcome of a query driven by a query of relationships to extract the parametric representation. At 310, the method may include connecting to at least one database of nodes organized by one semantic category. For example, the method may connect to a graph database having a hierarchy of semantic categories that subsume a grouping of objects represented as nodes within the database. In some embodiments, the objects may be associated with one or more parametric properties. Such parametric properties can be used to apply constraints for randomly generating synthetic data or synthetic image sets. For example, parametric properties may inform an object's dimensions, tolerances, and materials selection within the selected semantic category. For two objects defined by a relationship, the parametric property of the object within the desired semantic category may be inherited or inform the dimensions, tolerances, and materials of the related object.

At 320, the method may include selecting at least one relationship associated with at least one semantic category of nodes from one database of nodes. At 330, the method may include running a query of the selected at least one relationship. In some embodiments, the query may relate to at least one relationship associating a first node with at least a second node of the at least one database of nodes. At 340, the method may include storing the query in a configuration file. In some embodiments, storing the query in the configuration file as shown in step 340 may be considered an outcome of the method 300. In some embodiments, the method may include another outcome, including generating a synthetic dataset based on the extracted at least one parametric representation. In some embodiments, the method may include another outcome, including rendering a synthetic data image based on the extracted at least one parametric representation.

Figure 4:
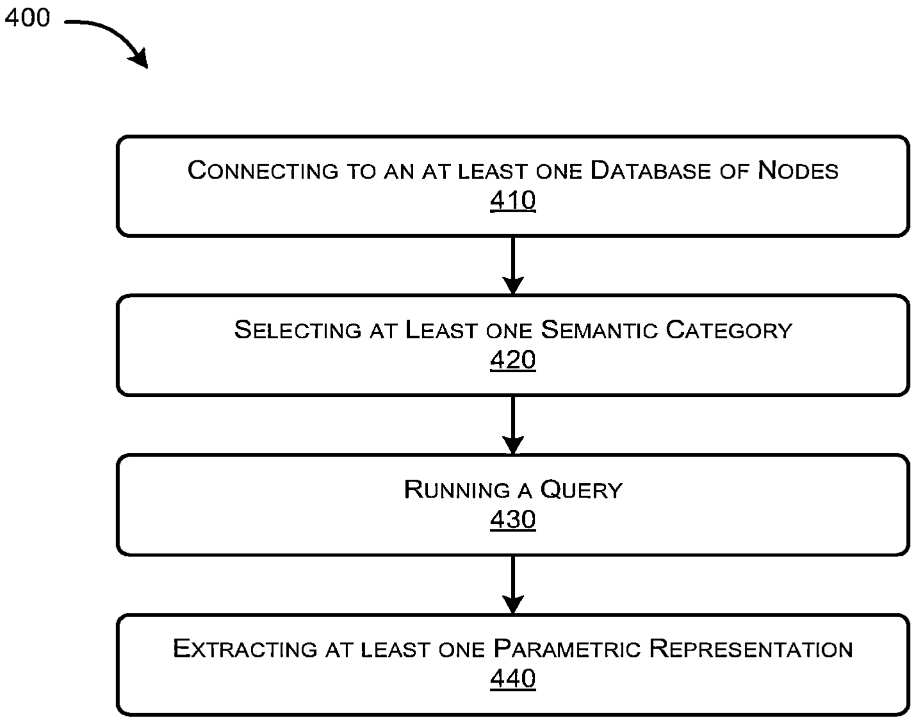
FIG. 4 depicts exemplary operations in a high-level logic flow of an operational process for extracting parametric representation of space or spacetime.

FIG. 4 shows an exemplary method according to some embodiments of the present disclosure. Specifically, FIG. 4 depicts exemplary operations in a high-level logic flow of an operational process for extracting parametric representation of space or spacetime. According to FIG. 4, embodiments may include a method for generating a parametric representation of space or spacetime, the method including steps 410 to 440. The method steps 410 to 440 mainly indicate the outcome of a query of a semantic category to extract the parametric representation. At 410, the method may include connecting to at least one database of nodes, the database of nodes organized by at least one semantic category. In some embodiments, each of the nodes from at least one database of nodes represents an object. In some embodiments, the object may be associated with one or more parametric properties. At 420, the method may include selecting at least one semantic category. At 430, the method may include running a query of the selected semantic category, the query containing the first node from at least one semantic category, and at least one relationship associated with the first node. In some embodiments, the relationship connects the first node to at least one second node. At 440, the method may include extracting at least one parametric representation. In some embodiments, at least one parametric representation includes the selected one or more relationships, a first object associated with one or more parametric properties of the first node, and a second object associated with one or more parametric properties of the second node. In some embodiments, the method may include an outcome including storing the query of the selected at least one semantic category in a configuration file. In some embodiments, the method may include another outcome, including generating a synthetic dataset based on the extracted at least one parametric representation. In some embodiments, the method may include another outcome, including rendering a synthetic data image based on the extracted at least one parametric representation.

Figure 5:
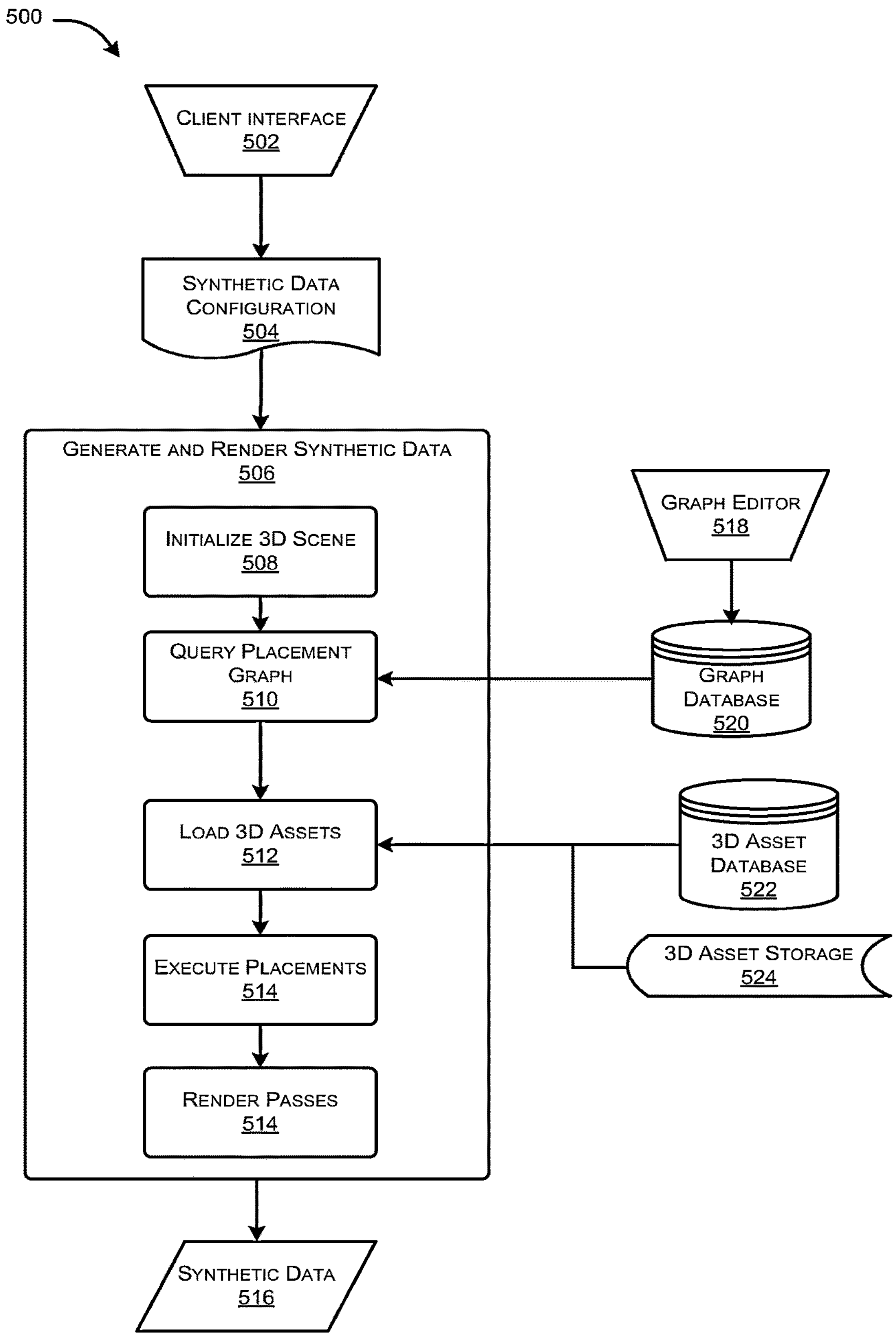
FIG. 5 depicts exemplary operations in a high-level logic flow of an operational process for generation of synthetic data.

FIG. 5 shows an exemplary method according to some embodiments of the present disclosure. Specifically, FIG. 5 depicts exemplary operations in a high-level logic flow of an operational process for generating synthetic data. According to FIG. 5, embodiments may include a method for generating the synthetic data, mainly including steps 506 to 516. In some embodiments, the client interface 502 may convey the requirements of configuration (504) for synthetic data. As shown in FIG. 5, at 506, based on the provided configuration, synthetic data may be generated and rendered in sub-steps 508-514. At 508, a 3D scene about a contextual environment may be initialized. The 3D scene may pertain to a perspective or a particular requirement of a 3D environment pertaining to extraction of parametric representation.

At 520, a database of nodes may be queried, wherein the database of nodes may include a plurality of nodes such that one node may be connected to other nodes through one or more edges. In some embodiments, the database of nodes may include a graph database 520 that can be edited using a graph editor 518. Each node of the plurality of nodes in the graph database 520 may pertain to an object. At 510, a query placement graph may be executed by connecting with the database of nodes (graph database 520). The query placement graph may pertain to query of relationships for evaluation of placement position of one object with respect to the other. In some embodiments, the query placement graph may result specifying a set of relative position relationships of one object to the other. In some embodiments, on a graph database, if a first object may be represented as a first node and a second object may be represented as a second node, then an edge extending from the first node to the second node may specify the placement of the second object with respect to the second object (such as, for example, set of relative position relationship). In some embodiments, the system may store one or more 3D perspectives relevant to the objects in 3D asset storage 524 or 3D asset database 522. Based on at least one semantic category corresponding to the nodes, at least one relationship may be selected, based on which, the processor may load 3D assets (at 512) from the 3D asset storage 524 and/or 3D asset database 522. At 514, the placement of the 3D assets may be executed based on the committed relationships 510. Optionally, at 514, the parametric representation may be rendered to generate the synthetic data at 516.

Figure 6A:
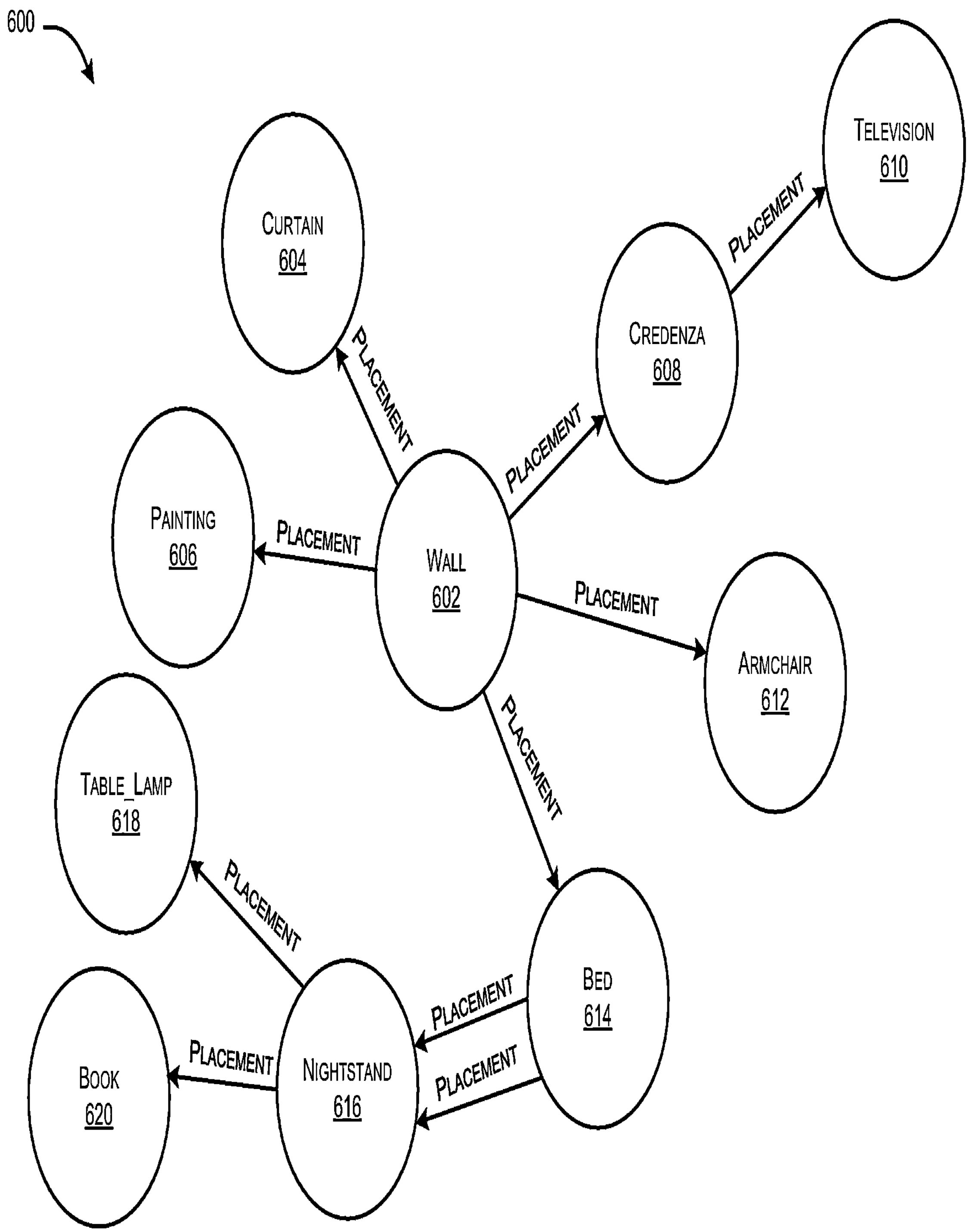
FIGS. 6A and 6B depict exemplary illustrations of a database of nodes representing storing information and relationships between different objects.
Figure 6B:
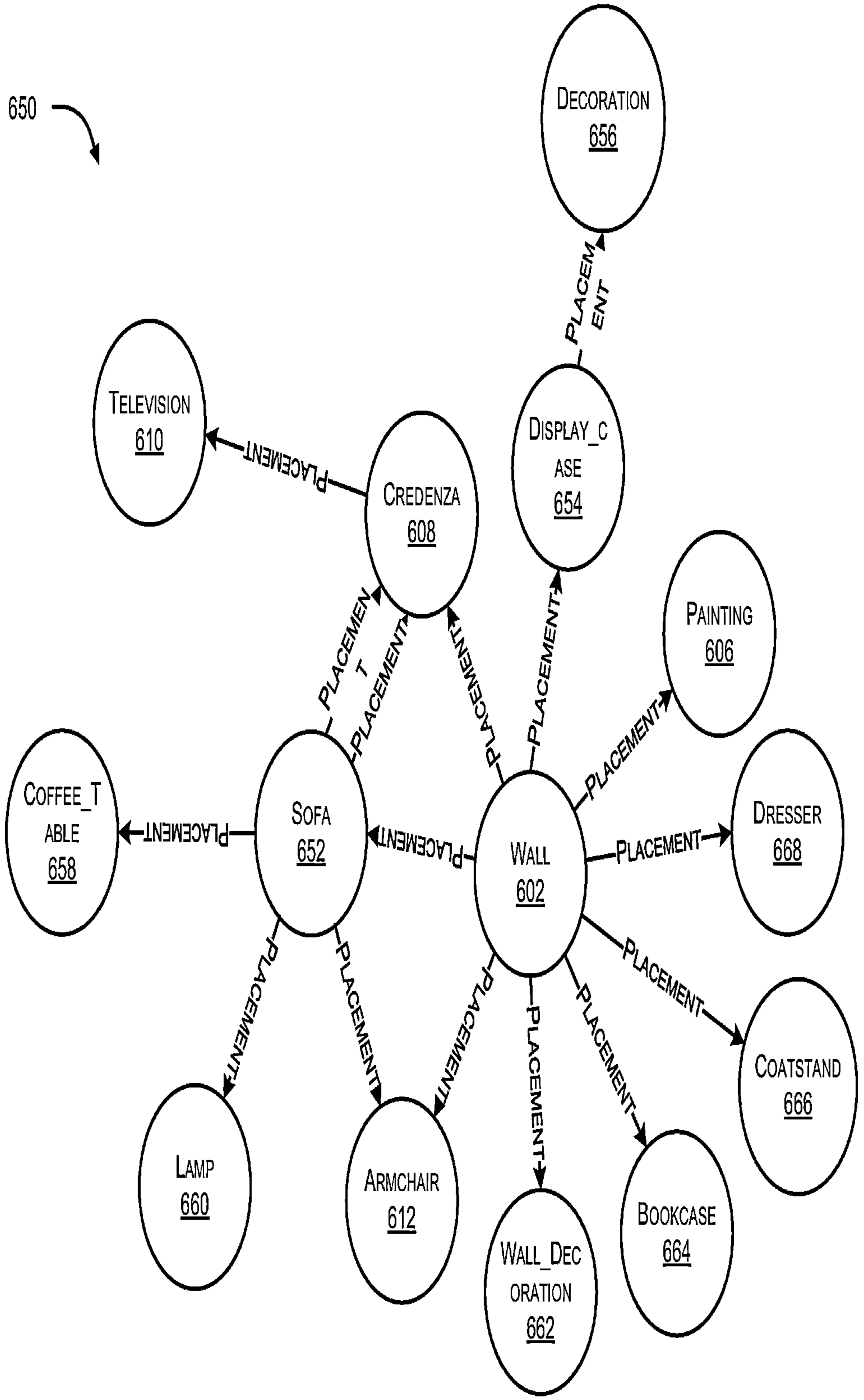

FIGS. 6A and 6B depict two independent exemplary illustrations (600 and 650) for database of nodes representing exemplary objects, according to some embodiments of the present disclosure. In some embodiments, the database of nodes (as explained in FIG. 1B) may be a graph database that may include plurality of nodes pertaining to objects such as, for example, objects of interior utility in a household such as including, but not limited to, furniture, electronic items, objects forming framework of the room (such as wall, door) and other objects within a room. As shown in FIGS. 6A and 6B, circles represent the plurality of nodes, wherein each node represents an object. Each object is connected to another object by a line arrow (i.e., edges) that describe the relationship between the objects. In some embodiments, the relationship illustrated by edges can pertain to placement of the objects.

Placement may include the relative position relationship between an object. For example, see FIG. 5 at 510 in which the query placement graph results in a set of relative position relationships of one object to the other. In this context, a first object may be selected based on which placement of other objects may be done. Referring now to FIG. 6A, in some embodiments, the first object is stationary or immovable so that the placement or relative position of other objects is determined with respect to the first object. For example, the first object selected may be a wall 602, upon which placement of a set of second objects from a semantic category "wall treatments" such as, for example semantic category members a curtain 604, painting 606, bed 614, armchair 612, and credenza 608 may be placed. In some embodiments, the placement of a set of third objects may be governed by the presence of the second object. For example, a third object, a television 610 may be placed with respect to the position of the second object i.e., a distance above the credenza 608. Similarly, the other objects, such as a table lamp 618 and book 620, may be placed with respect to the position of nightstand 616 (third object), which may itself be placed with respect to a bed 614 (second object), which in turn is placed with respect to the wall (602). It will be appreciated that the present non-limiting examples are intended to provide a clearer understanding and the embodiments of the present disclosure are not limited to the provided examples.

In some embodiments, at least one relationship (or placement) may be selected based on at least one semantic category corresponding to the nodes, based on which, a first node (pertaining to a first object) of the plurality of nodes may be selected based at least in part on the semantic category, and a second node (pertaining to a second object) may be selected based at least in part on a relationship of the second node with the first node. FIG. 7 depicts an example representation of a user interface 700 displaying a semantic category, bedroom 740, associated with the database of nodes of FIG. 6A, according to some embodiments of the present disclosure. As shown in the display 700 in FIG. 7, the objects described in FIG. 6A are categorized into a semantic category bedroom 740, wherein the relationship 720 is mentioned in terms of parent node 710 and child node 730. In such a relationship 720, the parent node 710 governs the placement of other objects, for example child 730, in the scene. For example, the placement of bed 614 is done with respect to the relation 760 with the parent node 710 the wall 602.

Other categories corresponding to the parent nodes 710 and child nodes 730 are provided in FIG. 7. In some embodiments, the relationship 720 between parent nodes 710 and child nodes 730 or the placement of the child node 730 with respect to the parent node 710 may be done based on a set of pre-defined rules. For example, the set of pre-defined set of rules may be unique for each object and may be based on the parametric properties associated with the object. In one embodiment, the relation entry 760 may include rules for how the bed 614 may be positioned with respect to the wall 602. For example, the placement orientation from the relation 760 may be "center" or center align the bed 614 with respect to the wall 602. Alternative relation entry 760 rules may include placement offsets in two-dimensional space.

In another embodiment, the parent node 710 corresponding to the object "nightstand" 716 and the child node 730 may correspond to an object "book" 620. In this example, the related set of pre-defined rules may be associated with at least one parametric property such as, for example, "put" to guide the position of the nightstand, light characteristics, and "rotation" property of the nightstand. In another example, as shown at 700 (second entry), the parent node 710 may correspond to the object "wall" 602, and the child node 730 may correspond to "credenza" 608. In this example, the related set of pre-defined rules 774 may be associated with at least one parametric property, such as, for example, "mount" position or orientation, e.g., "orientation," of the credenza 620 and light characteristics (e.g., "uv" or ultra-violet). Other relation 720 entries, 772, 776, 778, 780, 782, 784, 786 are provided in the tabular representation as shown in FIG. 7.

Referring to FIG. 6B, which also illustrates the database of nodes as in FIG. 6A, related to objects in a different room. A first node is wall 602. Based on the presence of wall decoration 662, the relationships of wall decoration 662 are queried in the database, for example a relational database, to identify candidate second objects for "placement." Second objects, such as, credenza 608, display case 654, painting 606, dresser 668, coat stand 666, bookcase 664, sofa 652, armchair 612, and wall decoration 662 may be placed. Similarly, the placement of a third object, such as coffee table 658 and lamp 660 may be chosen based on the placement of sofa 652. Key parameters of the design may require the placement of one of a coffee table 658 and/or lamp 660 in close proximity to the sofa 652. Similarly, the placement of a third object, such as decoration 656 and television 610 may be selected based on the display case 654 and the credenza 608. Such examples are not exhaustive and are intended to illustrate how the relationships between objects may be used to populate a synthetic data image. Such a graph of nodes could be applied for any number of environments where objects appear in groups defined by semantic categories and relationships.

Figure 8:
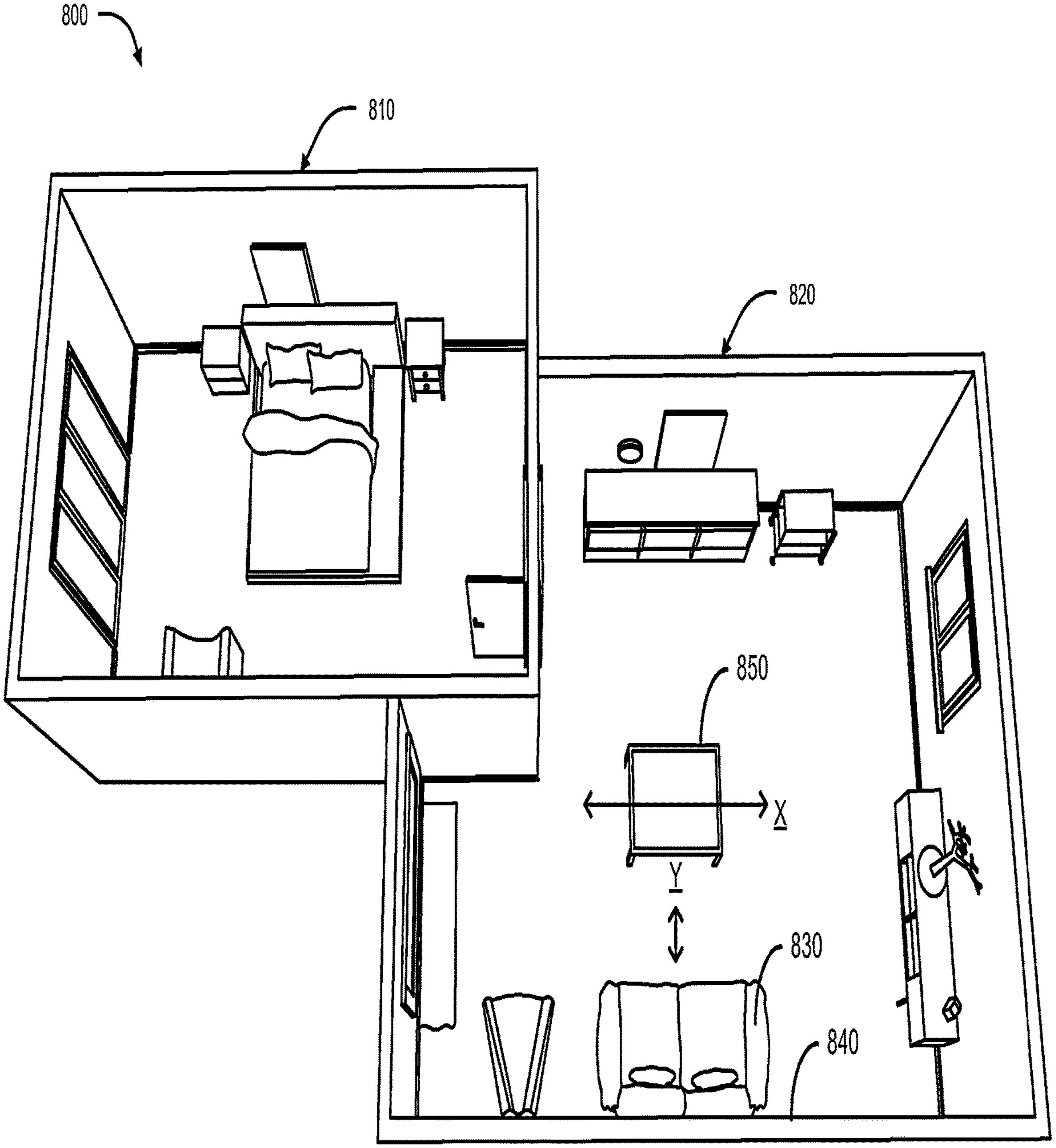
FIG. 8 depicts an example three-dimensional parametric representation illustrating a top view of physical representation (3D scene) showing a relative position of objects in 3D space.

FIG. 8 depicts a rendered perspective view of a three-dimensional synthetic parametric representation of a living space 800 according to some embodiments of the present disclosure. The rendered living space 800 may be generated from parametric representations including a relative position of a first object and a second object in the 3D space. In such an embodiment, the first object may be a member of a semantic category, for example a semantic category "seating" used to populate a living room 820. The "seating" category may be used to query nodes within the category. For example, nodes within the seating category may include a sofa 830. A sofa 830 may include parametric properties such as a two seat sofa, three seat sofa or the like. The placement of the sofa 830 within the three-dimensional living room space 820 may be governed by the relationship between the living room wall 840 and the sofa 830. For example, the relationship between the wall 840) and sofa 830 may dictate a "center" alignment between the two objects 840, 830 with a +/− variance in direction X. Such a scene may be generated using the process described in FIG. 1B or from the relationships amongst objects/nodes described in FIGS. 6A and 6B. In one embodiment, a configuration file may dictate that in some instances, a second object, for example a coffee table 850 may be placed if the sofa 830 is present. When a coffee table 850 is placed, the relative position of the coffee table 850 may be a distance Y from the sofa 830. The relative position may be determined based on the relationship between the two objects. In some embodiments, a parametric property may provide options for a size of the coffee table 850. In some embodiments, the parametric property may be governed by a relationship with the sofa 830. In some embodiments, the placement of the coffee table 850 may be placed a maximum distance Y away from the sofa 830, while a minimum distance Y may be dictated by a configuration file that provides a minimum "walking distance" between the edge of the coffee table 850 and edge of the sofa 830.

For example, the database of nodes depicted in FIG. 6A may also be used to generate the placement of objects in a three-dimensional (3D) space such as a bedroom 810 of FIG. 8. Similarly, the database of nodes depicted in FIG. 6B may be used to generate the placement of corresponding objects in an adjoining second three-dimensional (3D) space such as a living room 820. For example, the first object, a table and its parametric properties is used to guide the placement of the second object, the lamp on the surface of the table. In this example, the table is a member of the semantic category "furniture" and/or "tables." The rendered synthetic data and/or the parametric representation may be viewed on a user interface as shown in FIG. 9.

Figure 9:
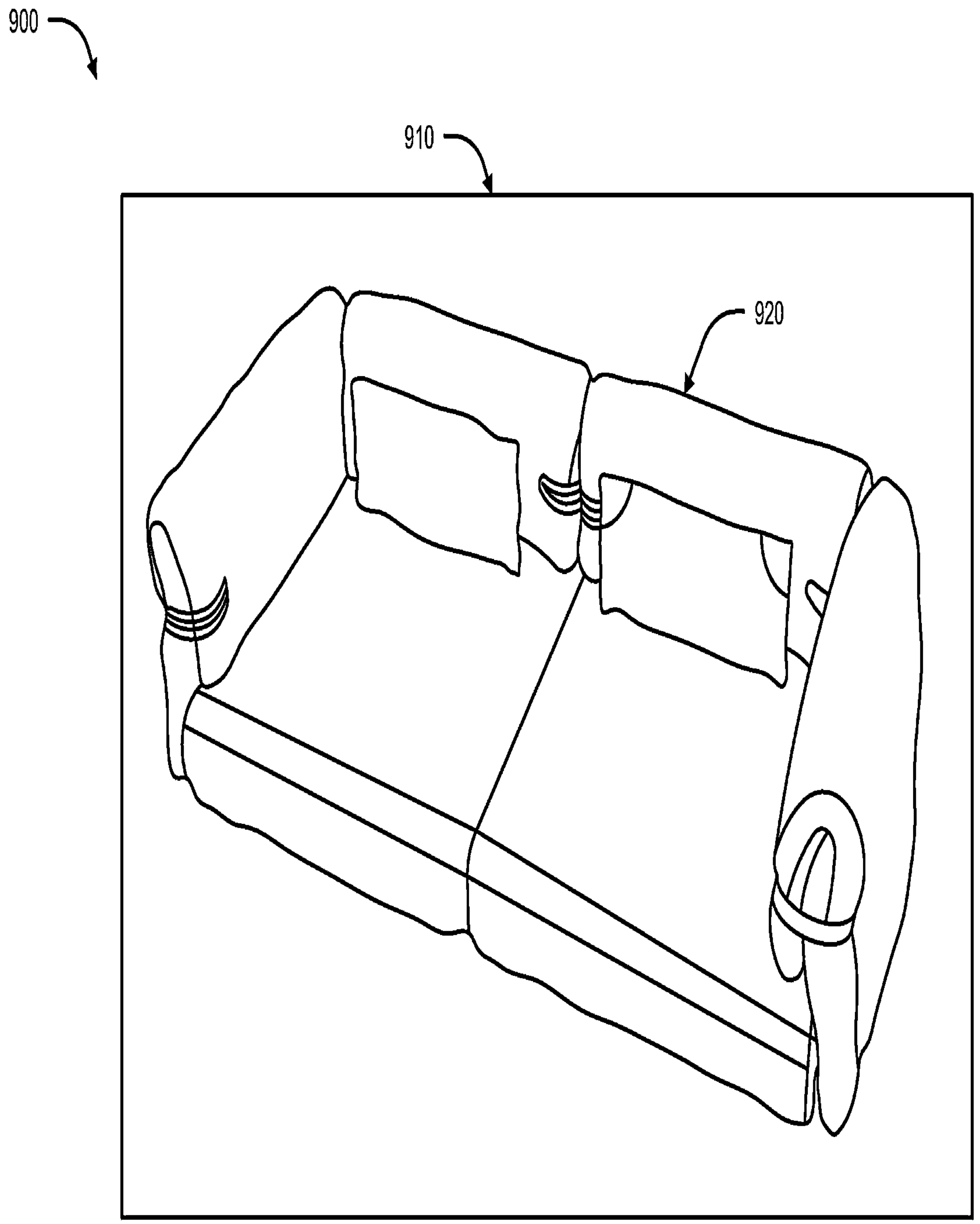
FIG. 9 depicts an example interface for view or altering parametric properties of a one or objects in the extracted parametric representation.

FIG. 9 depicts an example interface for viewing or altering parametric properties of one or objects in the generated parametric representation. The user interface may involve multiple provisions to alter and/or improve one or more parametric properties of individual objects, such as sofa 920 within the empty 3D scene 910.

Figure 10:
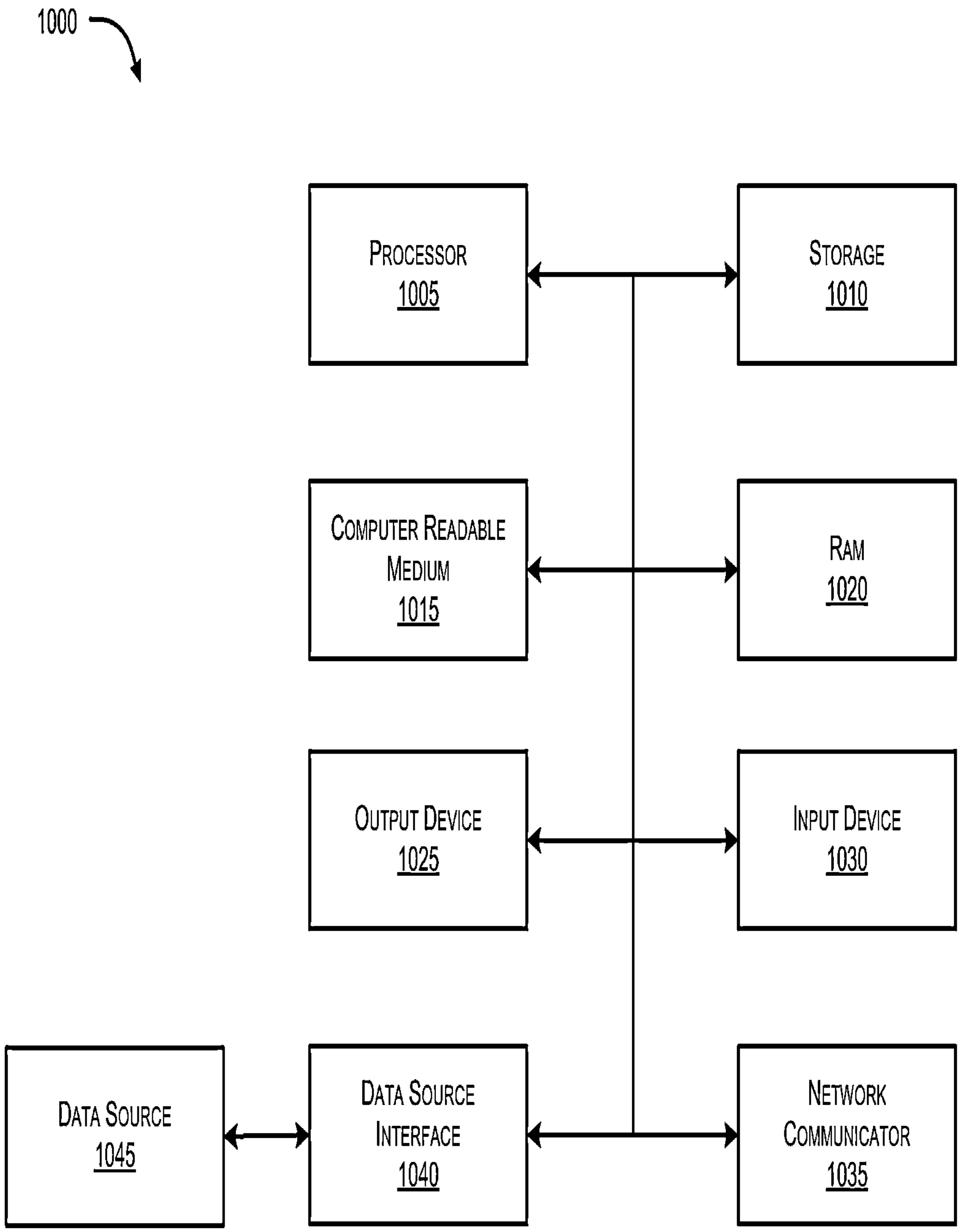
FIG. 10 illustrates a hardware platform for generation of parametric representation and synthetic data.

According to an example embodiment of the present disclosure, FIG. 10 illustrates a hardware platform 1000 for generating synthetic data from parametric and edge information of nodes within a graph database. For the sake of brevity, the form and some operational features of the system 100 discussed with regard to FIG. 1. Particularly, computing machines such as but not limited to internal/external server clusters, quantum computers, desktops, laptops, smartphones, and tablets, which may be used to execute system 100 or may include the structure of the hardware platform 1000 of FIG. 10. As illustrated, the hardware platform 1000 may include additional components not shown, and some of the components described may be removed, combined, and/or otherwise modified. For example, a computer system with multiple GPUs may be located on an external-cloud platform, including Amazon Web Services, or an on-premises corporate cloud computing cluster, or other organizational computing resources, etc.

The hardware platform 1000 may be a computer system such as the system 100 that may be used with the embodiments described herein. The computer system may represent a computational platform that includes components that may be in a server or another computer system. The computer system may execute, by the processor 1005 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 1005 that executes software instructions or code stored on a non-transitory computer-readable storage medium 1010 to perform methods of the present disclosure. The software code includes, for example, instructions to evaluate the anonymized datasets with original dataset.

The instructions on the computer-readable storage medium 1010 are read and stored the instructions in storage 1015 or in random access memory (RAM). The storage 1015 may provide a space for keeping static data where at least some instructions could be stored for later execution. The stored instructions may be further compiled to generate other representations of the instructions and dynamically stored in the RAM such as RAM 1020. The processor 1005 may read instructions from the RAM 1020 and perform actions as instructed.

The computer system may further include the output device 1025 to provide at least some of the results of the execution as output including, but not limited to, visual information to users, such as external agents. The output device 1025 may include a display on computing devices and virtual reality glasses. For example, the display may be a mobile phone screen or a laptop screen. GUIs and/or text may be presented as an output on the display screen. The computer system may further include an input device 1030 to provide a user or another device with mechanisms for entering data and/or otherwise interact with the computer system. The input device 1030 may include, for example, a keyboard, a keypad, a mouse, or a touchscreen. Each of these output device 1025 and input device 1030 may be joined by one or more additional peripherals.

A network communicator 1035 may be provided to connect the computer system to a network and in turn to other devices connected to the network including other clients, servers, data stores, and interfaces, for instance. A network communicator 1035 may include, for example, a network adapter such as a LAN adapter or a wireless adapter. The computer system may include a data sources interface 1040 to access the data source 1045. The data source 1045 may be an information resource. As an example, a database of exceptions and rules may be provided as the data source 1045. Moreover, knowledge repositories and curated data may be other examples of the data source 1045.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having ordinary skill in the art will recognize that the state of the art has progressed to the point where there is little distinction left between hardware, software, and/or firmware implementations of aspects of systems; the use of hardware, software, and/or firmware is generally a design choice representing cost vs. efficiency trade-offs (but not always, in that in certain contexts the choice between hardware and software can become significant). Those having ordinary skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

In certain cases, use of a system or method as disclosed and claimed herein may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific examples set forth and the accompanying discussion are intended to be representative of their more general classes. In general, use of any specific example is intended to be representative of its class, and the non-inclusion of specific components (e.g., operations), devices, and objects should not be taken to be limiting.

With respect to the use of substantially any plural and/or singular terms herein, those having ordinary skill in the art can translate from the plural to the singular or from the singular to the plural as is appropriate to the context or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, the following appended claims may contain usage of the introductory phrases "at least one" and "one or more"

to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such a recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having ordinary skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented as sequences of operations, it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

EXAMPLE EMBODIMENTS

Example 1 includes a computer-implemented method for generating a parametric representation, the method comprising: querying a database of nodes including a plurality of nodes, wherein each node of the plurality of nodes represents an object associated with one or more parametric properties; evaluating a set of relationships for at least one subset of nodes of the database of nodes; assigning a semantic category to at least one node of the plurality of nodes; and extracting a parametric representation corresponding to the plurality of nodes and the set of relationships; wherein a first node of the plurality of nodes is selected based at least in part on the semantic category, and wherein a second node is selected based at least in part on a relationship of the second node with the first node.

Example 2 includes the method of Example 1, further comprising: generating a synthetic dataset based on the parametric representation, wherein the synthetic dataset includes at least one element of the semantic category.

Example 3 includes the method of Example 2, wherein the synthetic dataset is generated using a query to identify a database of nodes, a set of relationships, and at least one parametric property to generate the synthetic dataset from the at least one subset of nodes.

Example 4 includes the method of any of Examples 2-3, wherein generating the synthetic dataset comprises rendering the synthetic dataset within a contextual environment.

Example 5 includes the method of any of Examples 1-4, wherein the database of nodes comprises at least one graph database.

Example 6 includes the method of any of Examples 1-5, wherein at least one node of the plurality of nodes represents a dimension of a three-dimensional (3D) space; and wherein the parametric representation pertains to space or spacetime and includes a 3D representation of at least one object corresponding to at least one node of the plurality of nodes in a 3D environment.

Example 7 includes the method of any of Examples 1-6, wherein the one or more parametric properties comprises a property of the object pertaining to at least one of a physical dimension, a light reflective property, a light absorptive property, a texture property, a movement property, a deformation property, a color property, or a metadata property.

Example 8 includes the method of Example 7, wherein the physical dimension comprises at least one of length, width, height, depth, perimeter, area, or volume.

Example 9 includes the method of any of Examples 7-8, wherein the light reflective property comprises at least one of specularity, translucence, opacity, diffusion, diffraction, refraction, or reflection.

Example 10 includes the method of any of Examples 7-9, wherein the light absorptive property comprises at least one of a matte property, a black property, or a shadow property.

Example 11 includes the method of any of Examples 7-10, wherein the movement property comprises at least one of velocity, acceleration, spin, or vibration.

Example 12 includes the method of Example 11, wherein the velocity movement property relates to a change in a relative position of the object over a period of time.

Example 13 includes the method of any of Examples 7-12, wherein the color property comprises at least one of hue, tone, bit depth, warmth, brightness, white balance, or contrast.

Example 14 includes the method of any of Examples 7-13, wherein the metadata property comprises at least one of a semantic tag, a binary code, a priority tag, a weighting tag, or a relationship tag.

Example 15 includes the method of any of Examples 1-14, wherein the one or more parametric properties is informed by sensor data associated with the object.

Example 16 includes the method of Example 15, wherein the sensor data comprise at least one of camera data, audio sensor data, touch sensor data, and position sensor data.

Example 17 includes the method of any of Examples 1-16, wherein the set of relationships comprises at least one of a relative position relationship, a relative size relationship, a relative movement relationship, a relative attraction relationship, or a relative repulsion relationship.

Example 18 includes the method of any of Examples 1-17, wherein evaluating the set of relationships further comprises: assigning one or more probabilities to a relationship subset of the set of relationships.

Example 19 includes the method of any of Examples 1-18, wherein the set of relationships further comprises named edges within a graph schema, wherein each edge represents a relationship between two nodes of the plurality of nodes.

Example 20 includes the method of any of Examples 1-19, wherein the set of relationships is depicted as a plurality of link-fact type representations in an Object-Role Model.

Example 21 includes the method of any of Examples 1-20, wherein the semantic category comprises at least one of an object category, an object type, an object name, an object metadata tag, or an object taxon.

Example 22 includes the method of any of Examples 1-21, wherein the parametric representation comprises a physical representation of a relative position of a first object and a second object in the 3D space, wherein the first object is a member of a specific subset of the semantic category.

Example 23 includes the method of any of Examples 6-22, wherein the first object is a table and the second object is a lamp such that the physical representation of the relative position of the first object and the second object in the 3D space includes a visual representation of the table supporting the lamp, and wherein the table is a member of the specific semantic category pertaining to furniture.

Example 24 includes the method of any of Examples 1-23, wherein the parametric representation comprises a configuration file.

Example 25 includes a computer-implemented method for generating a parametric representation, the method comprising: accessing at least one database of nodes including a plurality of nodes, wherein the plurality of nodes is based on at least one semantic category, wherein each of the nodes represents an object, and wherein each object is associated with one or more parametric properties; selecting at least one relationship associated with the plurality of nodes based on at least one semantic category; running a query of the selected at least one relationship, wherein the query pertains to a relationship associating a first node with at least a second node of the plurality of nodes; and extracting at least one parametric representation, wherein the at least one parametric representation includes at least a first object associated with the first node and a second object associated with the second node.

Example 26 includes the method of Example 25, further comprising storing the query in a configuration file.

Example 27 includes the method of any of Examples 25-26, further comprising generating a synthetic dataset based on at least one extracted parametric representation.

Example 28 includes the method of any of Examples 25-27, further comprising rendering a synthetic data image based on at least one extracted parametric representation.

Example 29 includes a computer-implemented method for generating a parametric representation of space or space-time, the method comprising: accessing at least one database of nodes, the database of nodes organized by at least one semantic category, wherein each of the nodes from the at least one database of nodes represents an object, and wherein the object is associated with one or more parametric properties; selecting the at least one semantic category; running a query of the selected at least one semantic category, the query containing a first node from the at least one semantic category and at least one relationship associated with the first node, wherein the relationship connects the first node to at least one second node; and extracting at least one parametric representation, wherein the at least one parametric representation includes 1) the selected one or more relationship; 2) a first object associated with one or more parametric properties of the first node, and 3) a second object associated with one or more parametric properties of the second node.

Example 30 includes the method of Example 29, further comprising storing the query of the selected at least one semantic category in a configuration file.

Example 31 includes the method of any of Examples 29-30, further comprising generating a synthetic dataset based on at least one extracted parametric representation.

Example 32 includes the method of any of Examples 29-31, further comprising rendering a synthetic data image based on the at least one extracted parametric representation.

Example 33 includes a system for generating a parametric representation, the system comprising: a processor coupled with a memory, the processor comprising: a parametric representation generator configured to: construct a database of nodes including a plurality of nodes, wherein each node of the plurality of nodes represents an object associated with one or more parametric properties; evaluate a set of relationships for at least one subset of nodes of the database of nodes; assign a semantic category to at least one node of the plurality of nodes; and extract a parametric representation corresponding to the plurality of nodes and the set of relationships; wherein a first node of the plurality of nodes is selected based at least in part on the semantic category, and wherein a second node is selected based at least in part on a relationship of the second node with the first node, and a synthetic data generator configured to: generate a synthetic dataset based on the parametric representation, wherein the synthetic dataset includes at least one element of the semantic category.

Example 34 includes a non-transitory computer-readable medium, wherein the non-transitory computer-readable medium comprises machine-executable instructions that when executed by a computer cause it to: construct a database of nodes including a plurality of nodes, wherein each node of the plurality of nodes represents an object associated with one or more parametric properties; evaluate a set of relationships for at least one subset of nodes of the database of nodes; assign a semantic category to at least one node of the plurality of nodes; and extract a parametric representation corresponding to the plurality of nodes and the set of relationships; wherein a first node of the plurality of nodes is selected based at least in part on the semantic category, and wherein a second node is selected based at least in part on a relationship of the second node with the first node.

Example 35 includes a method, comprising generating a parametric representation.

Example 36 includes a method, comprising generating a representation of an image.

Example 37 includes a method, comprising generating an image.

Example 38 includes a method, comprising generating a representation of an image including objects.

Example 39 includes a method, comprising generating a representation of an image including representations of objects.

Example 40 includes a method, comprising generating a representation of an image including objects each having a respective property and arranged according to a relationship.

Example 41 includes a method, comprising generating a representation of an image including representations of objects each having a respective property and arranged according to a relationship.

Example 42 includes a method, comprising: receiving respective representations of objects; receiving respective properties of the objects; receiving a relationship of the objects to one another; and generating a representation of an image including the objects each having the respective property and arranged according to the relationship.

Example 43 includes a method, comprising: receiving respective representations of objects; receiving properties associated with the objects; receiving relationships associated with the objects; generating, from the associated properties, a respective property for each object; generating, from the associated relationships, a relationship of the objects relative to one another; and generating a representation of an image including the objects each having the respective property and arranged according to the relationship.

Example 44 includes a method, comprising: receiving respective representations of objects; receiving property ranges associated with the objects; receiving relationship ranges associated with the objects; generating a respective property for each object; generating, from the relationship ranges, a relationship of the objects relative to one another; and generating a representation of an image including the objects each having the respective property and arranged according to the relationship.

Example 45 includes a method, comprising: retrieving, from a database, respective representations of objects; retrieving, from a database, respective properties of the objects; retrieving, from a database, a relationship of the objects to one another; and generating a representation of an image including the objects each having the respective property and arranged according to the relationship.

Example 46 includes a method, comprising: retrieving, from a database, respective representations of objects; retrieving, from a database, properties associated with the objects; retrieving, from a database, relationships associated with the objects; generating, from the associated properties, a respective property for each object; generating, from the associated relationships, a relationship of the objects relative to one another; and generating a representation of an image including the objects each having the respective property and arranged according to the relationship.

Example 47 includes a method, comprising: retrieving, from a database, respective representations of objects; retrieving, from a database, property ranges associated with the objects; retrieving, from a database, relationship ranges associated with the objects; generating, from a property ranges, a respective property for each object; generating, from the relationship ranges, a relationship of the objects relative to one another; and generating a representation of an image including the objects each having the respective property and arranged according to the relationship.

Example 48 includes a method, comprising generating a representation of an object.

Example 49 includes a method, comprising generating representations of objects.

Example 50 includes a method, comprising generating representations of objects each associated with a respective property.

Example 51 includes a method, comprising generating representations of objects each associated with a property having a respective range of property values.

Example 52 includes a method, comprising generating representations of objects, each representation associated with a respective property.

Example 53 includes a method, comprising generating representations of objects, each representation associated with a property having a respective range of property values.

Example 54 includes a method, comprising generating representations of objects each associated with a respective object type.

Example 55 includes a method, comprising generating representations of objects, each representation associated with a respective object type.

Example 56 includes a method, comprising generating a database of representations of objects.

Example 57 includes a method, comprising generating a database of representations of objects each associated with a respective property.

Example 58 includes a method, comprising generating a database of representations of objects each associated with a property having a respective range of property values.

Example 59 includes a method, comprising generating a database of representations of objects, each representation associated with a respective property.

Example 60 includes a method, comprising generating a database of representations of objects, each representation associated with a property having a respective range of property values.

Example 61 includes a method, comprising generating a database of representations of objects each associated with a respective object type.

Example 62 includes an electronic circuit configured to generate a database of representations of objects, each representation associated with a respective object type.

Example 63 includes an electronic circuit configured to generate a parametric representation.

Example 64 includes an electronic circuit configured to generate a representation of an image.

Example 65 includes an electronic circuit configured to generate an image.

Example 66 includes an electronic circuit configured to generate a representation of an image including objects.

Example 67 includes an electronic circuit configured to generate a representation of an image including representations of objects.

Example 68 includes an electronic circuit configured to generate a representation of an image including objects each having a respective property and arranged according to a relationship.

Example 69 includes an electronic circuit configured to generate a representation of an image including representations of objects each having a respective property and arranged according to a relationship.

Example 70 includes an electronic circuit configured: to receive respective representations of objects; to receive respective properties of the objects; to receive a relationship of the objects to one another; and to generate a representation of an image including the objects each having the respective property and arranged according to the relationship.

Example 71 includes an electronic circuit configured: to receive respective representations of objects; to receive properties associated with the objects; to receive relationships associated with the objects; to generate, from the associated properties, a respective property for each object; to generate, from the associated relationships, a relationship of the objects relative to one another; and to generate a representation of an image including the objects each having the respective property and arranged according to the relationship.

Example 72 includes an electronic circuit configured: to receive respective representations of objects; to receive property ranges associated with the objects; to receive relationship ranges associated with the objects; to generate a respective property for each object; to generate, from the relationship ranges, a relationship of the objects relative to one another; and to generate a representation of an image including the objects each having the respective property and arranged according to the relationship.

Example 73 includes an electronic circuit configured: to retrieve, from a database, respective representations of objects; to retrieve, from a database, respective properties of the objects; to retrieve, from a database, a relationship of the objects to one another; and to generate a representation of an image including the objects each having the respective property and arranged according to the relationship.

Example 74 includes an electronic circuit configured: to retrieve, from a database, respective representations of objects; to retrieve, from a database, properties associated with the objects; to retrieve, from a database, relationships associated with the objects; to generate, from the associated properties, a respective property for each object; to generate, from the associated relationships, a relationship of the objects relative to one another; and to generate a representation of an image including the objects each having the respective property and arranged according to the relationship.

Example 75 includes an electronic circuit configured: to retrieve, from a database, respective representations of objects; to retrieve, from a database, property ranges associated with the objects; to retrieve, from a database, relationship ranges associated with the objects; to generate, from a property ranges, a respective property for each object; to generate, from the relationship ranges, a relationship of the objects relative to one another; and to generate a representation of an image including the objects each having the respective property and arranged according to the relationship.

Example 76 includes an electronic circuit configured to generate a representation of an object.

Example 77 includes an electronic circuit configured to generate representations of objects.

Example 78 includes an electronic circuit configured to generate representations of objects each associated with a respective property.

Example 79 includes an electronic circuit configured to generate representations of objects each associated with a property having a respective range of property values.

Example 80 includes an electronic circuit configured to generate representations of objects, each representation associated with a respective property.

Example 81 includes an electronic circuit configured to generate representations of objects, each representation associated with a property having a respective range of property values.

Example 82 includes an electronic circuit configured to generate representations of objects each associated with a respective object type.

Example 83 includes an electronic circuit configured to generate representations of objects, each representation associated with a respective object type.

Example 84 includes an electronic circuit configured to generate a database of representations of objects.

Example 85 includes an electronic circuit configured to generate a database of representations of objects each associated with a respective property.

Example 86 includes an electronic circuit configured to generate a database of representations of objects each associated with a property having a respective range of property values.

Example 87 includes an electronic circuit configured to generate a database of representations of objects, each representation associated with a respective property.

Example 88 includes an electronic circuit configured to generate a database of representations of objects, each representation associated with a property having a respective range of property values.

Example 89 includes an electronic circuit configured to generate a database of representations of objects each associated with a respective object type.

Example 90 includes an electronic circuit configured to generate a database of representations of objects, each representation associated with a respective object type.

Example 91 includes a non-transitory computer-readable medium, wherein the non-transitory computer-readable medium comprises machine-executable instructions that when executed by a computer cause it to generate a parametric representation.

Example 92 includes a non-transitory computer-readable medium, wherein the non-transitory computer-readable medium comprises machine-executable instructions that when executed by a computer cause it to generate a representation of an image.

Example 93 includes a non-transitory computer-readable medium, wherein the non-transitory computer-readable medium comprises machine-executable instructions that when executed by a computer cause it to generate an image.

Example 94 includes a non-transitory computer-readable medium, wherein the non-transitory computer-readable medium comprises machine-executable instructions that when executed by a computer cause it to generate a representation of an image including objects.

Example 95 includes a non-transitory computer-readable medium, wherein the non-transitory computer-readable medium comprises machine-executable instructions that when executed by a computer cause it to generate a representation of an image including representations of objects.

Example 96 includes a non-transitory computer-readable medium, wherein the non-transitory computer-readable medium comprises machine-executable instructions that when executed by a computer cause it to generate a representation of an image including objects each having a respective property and arranged according to a relationship.

Example 97 includes a non-transitory computer-readable medium, wherein the non-transitory computer-readable medium comprises machine-executable instructions that when executed by a computer cause it to generate a representation of an image including representations of objects each having a respective property and arranged according to a relationship.

Example 98 includes a non-transitory computer-readable medium, wherein the non-transitory computer-readable medium comprises machine-executable instructions that when executed by a computer cause it to: receive respective representations of objects; receive respective properties of the objects; receive a relationship of the objects to one another; and generate a representation of an image including the objects each having the respective property and arranged according to the relationship.

Example 99 includes a non-transitory computer-readable medium, wherein the non-transitory computer-readable medium comprises machine-executable instructions that when executed by a computer cause it to: receive respective representations of objects; receive properties associated with the objects; receive relationships associated with the objects; generate, from the associated properties, a respective property for each object; generate, from the associated relationships, a relationship of the objects relative to one another; and generate a representation of an image including the objects each having the respective property and arranged according to the relationship.

Example 100 includes a non-transitory computer-readable medium, wherein the non-transitory computer-readable medium comprises machine-executable instructions that when executed by a computer cause it to: receive respective representations of objects; receive property ranges associated with the objects; receive relationship ranges associated with the objects; generate a respective property for each object; generate, from the relationship ranges, a relationship of the objects relative to one another; and generate a representation of an image including the objects each having the respective property and arranged according to the relationship.

Example 101 includes a non-transitory computer-readable medium, wherein the non-transitory computer-readable medium comprises machine-executable instructions that when executed by a computer cause it to: retrieve, from a database, respective representations of objects; retrieve, from a database, respective properties of the objects; retrieve, from a database, a relationship of the objects to one another; and generate a representation of an image including the objects each having the respective property and arranged according to the relationship.

Example 102 includes a non-transitory computer-readable medium, wherein the non-transitory computer-readable medium comprises machine-executable instructions that when executed by a computer cause it to: retrieve, from a database, respective representations of objects; retrieve, from a database, properties associated with the objects; retrieve, from a database, relationships associated with the objects; generate, from the associated properties, a respective property for each object; generate, from the associated relationships, a relationship of the objects relative to one another; and generate a representation of an image including the objects each having the respective property and arranged according to the relationship.

Example 103 includes a non-transitory computer-readable medium, wherein the non-transitory computer-readable medium comprises machine-executable instructions that when executed by a computer cause it to: retrieve, from a database, respective representations of objects; retrieve, from a database, property ranges associated with the objects; retrieve, from a database, relationship ranges associated with the objects; generate, from a property ranges, a respective property for each object; generate, from the relationship ranges, a relationship of the objects relative to one another; and generate a representation of an image including the objects each having the respective property and arranged according to the relationship.

Example 104 includes a non-transitory computer-readable medium, wherein the non-transitory computer-readable medium comprises machine-executable instructions that when executed by a computer cause it to generate a representation of an object.

Example 105 includes a non-transitory computer-readable medium, wherein the non-transitory computer-readable medium comprises machine-executable instructions that when executed by a computer cause it to generate representations of objects.

Example 106 includes a non-transitory computer-readable medium, wherein the non-transitory computer-readable medium comprises machine-executable instructions that when executed by a computer cause it to generate representations of objects each associated with a respective property.

Example 107 includes a non-transitory computer-readable medium, wherein the non-transitory computer-readable medium comprises machine-executable instructions that when executed by a computer cause it to generate representations of objects each associated with a property having a respective range of property values.

Example 108 includes a non-transitory computer-readable medium, wherein the non-transitory computer-readable medium comprises machine-executable instructions that when executed by a computer cause it to generate representations of objects, each representation associated with a respective property.

Example 109 includes a non-transitory computer-readable medium, wherein the non-transitory computer-readable medium comprises machine-executable instructions that when executed by a computer cause it to generate representations of objects, each representation associated with a property having a respective range of property values.

Example 110 includes a non-transitory computer-readable medium, wherein the non-transitory computer-readable medium comprises machine-executable instructions that when executed by a computer cause it to generate representations of objects each associated with a respective object type.

Example 111 includes a non-transitory computer-readable medium, wherein the non-transitory computer-readable medium comprises machine-executable instructions that when executed by a computer cause it to generate representations of objects, each representation associated with a respective object type.

Example 112 includes a non-transitory computer-readable medium, wherein the non-transitory computer-readable medium comprises machine-executable instructions that when executed by a computer cause it to generate a database of representations of objects.

Example 113 includes a non-transitory computer-readable medium, wherein the non-transitory computer-readable medium comprises machine-executable instructions that when executed by a computer cause it to generate a database of representations of objects each associated with a respective property.

Example 114 includes a non-transitory computer-readable medium, wherein the non-transitory computer-readable medium comprises machine-executable instructions that when executed by a computer cause it to generate a database of representations of objects each associated with a property having a respective range of property values.

Example 115 includes a non-transitory computer-readable medium, wherein the non-transitory computer-readable medium comprises machine-executable instructions that when executed by a computer cause it to generate a database of representations of objects, each representation associated with a respective property.

Example 116 includes a non-transitory computer-readable medium, wherein the non-transitory computer-readable medium comprises machine-executable instructions that when executed by a computer cause it to generate a database of representations of objects, each representation associated with a property having a respective range of property values.

Example 117 includes a non-transitory computer-readable medium, wherein the non-transitory computer-readable medium comprises machine-executable instructions that when executed by a computer cause it to generate a database of representations of objects each associated with a respective object type.

Example 118 includes an apparatus, comprising means for generating a parametric representation.

Example 119 includes an apparatus, comprising means for generating a representation of an image.

Example 120 includes an apparatus, comprising means for generating an image.

Example 121 includes an apparatus, comprising means for generating a representation of an image including objects.

Example 122 includes an apparatus, comprising means for generating a representation of an image including representations of objects.

Example 123 includes an apparatus, comprising means for generating a representation of an image including objects each having a respective property and arranged according to a relationship.

Example 124 includes an apparatus, comprising means for generating a representation of an image including representations of objects each having a respective property and arranged according to a relationship.

Example 125 includes an apparatus, comprising: means for receiving respective representations of objects; means for receiving respective properties of the objects; means for receiving a relationship of the objects to one another; and means for generating a representation of an image including the objects each having the respective property and arranged according to the relationship.

Example 126 includes an apparatus, comprising: means for receiving respective representations of objects; means for receiving properties associated with the objects; means for receiving relationships associated with the objects; means for generating, from the associated properties, a respective property for each object; means for generating, from the associated relationships, a relationship of the objects relative to one another; and means for generating a representation of an image including the objects each having the respective property and arranged according to the relationship.

Example 127 includes an apparatus, comprising: means for receiving respective representations of objects; means for receiving property ranges associated with the objects; means for receiving relationship ranges associated with the objects; means for generating a respective property for each object; means for generating, from the relationship ranges, a relationship of the objects relative to one another; and means for generating a representation of an image including the objects each having the respective property and arranged according to the relationship.

Example 128 includes an apparatus, comprising: means for retrieving, from a database, respective representations of objects; means for retrieving, from a database, respective properties of the objects; means for retrieving, from a database, a relationship of the objects to one another; and means for generating a representation of an image including the objects each having the respective property and arranged according to the relationship.

Example 129 includes an apparatus, comprising: means for retrieving, from a database, respective representations of objects; means for retrieving, from a database, properties associated with the objects; means for retrieving, from a database, relationships associated with the objects; means for generating, from the associated properties, a respective property for each object; means for generating, from the associated relationships, a relationship of the objects relative to one another; and means for generating a representation of an image including the objects each having the respective property and arranged according to the relationship.

Example 130 includes an apparatus, comprising: means for retrieving, from a database, respective representations of objects; means for retrieving, from a database, property ranges associated with the objects; means for retrieving, from a database, relationship ranges associated with the objects; means for generating, from a property ranges, a respective property for each object; means for generating, from the relationship ranges, a relationship of the objects relative to one another; and means for generating a representation of an image including the objects each having the respective property and arranged according to the relationship.

Example 131 includes an apparatus, comprising means for generating a representation of an object.

Example 132 includes an apparatus, comprising means for generating representations of objects.

Example 133 includes an apparatus, comprising means for generating representations of objects each associated with a respective property.

Example 134 includes an apparatus, comprising means for generating representations of objects each associated with a property having a respective range of property values.

Example 135 includes an apparatus, comprising means for generating representations of objects, each representation associated with a respective property.

Example 136 includes an apparatus, comprising means for generating representations of objects, each representation associated with a property having a respective range of property values.

Example 137 includes an apparatus, comprising means for generating representations of objects each associated with a respective object type.

Example 138 includes an apparatus, comprising means for generating representations of objects, each representation associated with a respective object type.

Example 139 includes an apparatus, comprising means for generating a database of representations of objects.

Example 140 includes an apparatus, comprising means for generating a database of representations of objects each associated with a respective property.

Example 141 includes an apparatus, comprising means for generating a database of representations of objects each associated with a property having a respective range of property values.

Example 142 includes an apparatus, comprising means for generating a database of representations of objects, each representation associated with a respective property.

Example 143 includes an apparatus, comprising means for generating a database of representations of objects, each representation associated with a property having a respective range of property values.

Example 144 includes an apparatus, comprising means for generating a database of representations of objects each associated with a respective object type.

Example 145 includes the apparatus, method, computer-readable medium, and electronic circuit of any of Examples 1-144 wherein a representation of an image includes a non-optical representation of the image.

Example 146 includes the apparatus, method, computer-readable medium, and electronic circuit of any of Examples 1-145 wherein a representation of an object includes a non-optical representation of the object.

Example 147 includes the apparatus, method, computer-readable medium, and electronic circuit of any of Examples 1-146 wherein a parametric representation includes a non-optical parametric representation.

What is claimed is:

1. A computer-implemented method for generating a parametric representation, the method comprising:

querying a database of nodes including a plurality of nodes, wherein each node of the plurality of nodes represents an object associated with one or more parametric properties;

evaluating a set of relationships for at least one subset of nodes of the database of nodes;

assigning a semantic category to at least one node of the plurality of nodes; and extracting a parametric representation corresponding to the plurality of nodes and the set of relationships;

wherein a first node of the plurality of nodes is selected based at least in part on the semantic category, and wherein a second node is selected based at least in part on a relationship of the second node with the first node.

2. The method of claim 1, wherein at least one node of the plurality of nodes represents a dimension of a three-dimensional (3D) space; and wherein the parametric representation pertains to space or spacetime and includes a 3D representation of at least one object corresponding to at least one node of the plurality of nodes in a 3D environment.

3. The method of claim 1, wherein the one or more parametric properties comprises a property of the object pertaining to at least one of a physical dimension, a light reflective property, a light absorptive property, a texture property, a movement property, a deformation property, a color property, or a metadata property.

4. The method of claim 3, wherein the metadata property comprises at least one of a semantic tag, a binary code, a priority tag, a weighting tag, or a relationship tag.

5. The method of claim 3, wherein the parametric representation comprises a physical representation of a relative position of a first object and a second object in the 3D space, wherein the first object is a member of a specific subset of the semantic category.

6. The method of claim 1, wherein the set of relationships comprises at least one of a relative position relationship, a relative size relationship, a relative movement relationship, a relative attraction relationship, or a relative repulsion relationship.

7. The method of claim 1, wherein evaluating the set of relationships further comprises:

assigning one or more probabilities to a relationship subset of the set of relationships.

8. The method of claim 1, wherein the set of relationships further comprises named edges within a graph schema, wherein each edge represents a relationship between two nodes of the plurality of nodes.

9. The method of claim 1, wherein the set of relationships is depicted as a plurality of link-fact type representations in an Object-Role Model.

10. The method of claim 1, wherein the parametric representation comprises a configuration file.

11. A computer-implemented method for generating a parametric representation, the method comprising:

accessing at least one database of nodes including a plurality of nodes, wherein the plurality of nodes is based on at least one semantic category, wherein each of the nodes represents an object, and wherein each object is associated with one or more parametric properties;

selecting at least one relationship associated with the plurality of nodes based on at least one semantic category;

running a query of the selected at least one relationship, wherein the query pertains to a relationship associating a first node with at least a second node of the plurality of nodes; and extracting at least one parametric representation, wherein the at least one parametric representation includes at least a first object associated with the first node and a second object associated with the second node.

12. The method of claim 11, further comprising storing the query in a configuration file.

13. The method of claim 11, further comprising generating a synthetic dataset based on at least one extracted parametric representation.

14. The method of claim 11, further comprising rendering a synthetic data image based on at least one extracted parametric representation.

15. The method of claim 11, wherein rendering a synthetic data image based on at least one extracted parametric representation further comprises applying the at least one extracted parametric representation for randomly generating synthetic image sets.

16. The method of claim 11, wherein rendering a synthetic data image based on at least one extracted parametric representation further comprises rendering at least one photorealistic image.

17. A computer-implemented method for generating a parametric representation of space or spacetime, the method comprising:

accessing at least one database of nodes, the database of nodes organized by at least one semantic category, wherein each of the nodes from the at least one database of nodes represents an object, and wherein the object is associated with one or more parametric properties;

selecting the at least one semantic category;

running a query of the selected at least one semantic category, the query containing a first node from the at least one semantic category and at least one relationship associated with the first node, wherein the relationship connects the first node to at least one second node; and extracting at least one parametric representation, wherein the at least one parametric representation includes 1) the selected one or more relationship; 2) a first object associated with one or more parametric properties of the first node, and 3) a second object associated with one or more parametric properties of the second node.

18. The method of claim 17, further comprising storing the query of the selected at least one semantic category in a configuration file.

19. The method of claim 17, further comprising generating a synthetic dataset based on at least one extracted parametric representation.

20. The method of claim 17, further comprising rendering a synthetic data image based on the at least one extracted parametric representation.

* * * * *